US011769089B2

(12) United States Patent
Okazaki et al.

(10) Patent No.: US 11,769,089 B2
(45) Date of Patent: Sep. 26, 2023

(54) OPERATION MANAGEMENT APPARATUS OF VEHICLE, OPERATION MANAGEMENT METHOD, AND TRANSPORTATION SYSTEM

(71) Applicants: TOYOTA JIDOSHA KABUSHIKI KAISHA, Toyota (JP); DENSO CORPORATION, Kariya (JP)

(72) Inventors: Kenji Okazaki, Toyota (JP); Hiroshi Higashide, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/214,990

(22) Filed: Mar. 29, 2021

(65) Prior Publication Data
US 2021/0312357 A1 Oct. 7, 2021

(30) Foreign Application Priority Data
Apr. 2, 2020 (JP) .................................. 2020-066593

(51) Int. Cl.
*G06Q 10/0631* (2023.01)
*G06Q 10/04* (2023.01)

(52) U.S. Cl.
CPC ....... *G06Q 10/06312* (2013.01); *G06Q 10/04* (2013.01); *G06Q 10/06313* (2013.01)

(58) Field of Classification Search
None
See application file for complete search history.

(56) References Cited

U.S. PATENT DOCUMENTS 7,869,942 B2 * 1/2011 Naito .................. G06Q 10/047
  340/995.22
8,352,112 B2 * 1/2013 Mudalige ............... G08G 1/163
  342/458

(Continued)

FOREIGN PATENT DOCUMENTS

CN 107481512 A 12/2017
CN 109657845 B 9/2020
(Continued)

OTHER PUBLICATIONS

Li, Min-Tang, et al. "Simulation model for estimating bus dwell time by simultaneously considering numbers of disembarking and boarding passengers." Transportation Research Record 1971.1 (2006): 59-65. (Year: 2006).*

(Continued)

*Primary Examiner* — Timothy Padot
*Assistant Examiner* — Derick J Holzmacher
(74) *Attorney, Agent, or Firm* — Oliff PLC

(57) ABSTRACT

An operation management apparatus includes: a plan generator that generates a travel plane for each of a plurality of vehicles which form a vehicle line and which travel autonomously along a prescribed travel path; a communication device that transmits the travel plan to a corresponding vehicle; and a judging unit that judges necessity of an addition of a vehicle to the vehicle line and an elimination of a vehicle from the vehicle line. When it is judged that the addition of the vehicle is necessary, the plan generator determines a position of addition of a new vehicle in the vehicle line based on at least one of travel information and passenger information transmitted from each of the plurality of vehicles, and generates a travel plan for adding the new vehicle at the position of addition.

13 Claims, 22 Drawing Sheets

(56) References Cited

U.S. PATENT DOCUMENTS

| | | | |
|---|---|---|---|
| 9,849,832 B2* | 12/2017 | Mori | B60R 1/00 |
| 10,227,073 B2* | 3/2019 | Urano | G05D 1/0061 |
| 2010/0262362 A1* | 10/2010 | Naito | G08G 1/0969 |
| | | | 715/810 |
| 2011/0098908 A1* | 4/2011 | Chun | B61B 1/00 |
| | | | 701/117 |
| 2014/0052675 A1* | 2/2014 | Ko | G06N 5/02 |
| | | | 706/14 |
| 2014/0316671 A1* | 10/2014 | Okamoto | G08G 1/22 |
| | | | 701/96 |
| 2015/0073702 A1* | 3/2015 | Jouaux | H04W 4/029 |
| | | | 701/519 |
| 2015/0206437 A1* | 7/2015 | Fowler | G06Q 10/047 |
| | | | 701/410 |
| 2015/0308844 A1* | 10/2015 | Shimazaki | G01C 21/3423 |
| | | | 701/465 |
| 2015/0360705 A1* | 12/2015 | Niinomi | B60L 15/40 |
| | | | 701/118 |
| 2015/0360706 A1* | 12/2015 | Niinomi | B61L 27/12 |
| | | | 701/19 |
| 2016/0042639 A1* | 2/2016 | Onishi | G06Q 50/30 |
| | | | 701/117 |
| 2016/0210851 A1 | 7/2016 | Oshima et al. | |
| 2016/0362022 A1* | 12/2016 | Mathews, Jr. | G06F 17/10 |
| 2017/0091890 A1* | 3/2017 | Hirose | B60L 53/305 |
| 2017/0219362 A1* | 8/2017 | Bryson | G06Q 10/00 |
| 2017/0236415 A1* | 8/2017 | Okabe | G08G 1/096844 |
| | | | 701/117 |
| 2018/0342113 A1* | 11/2018 | Kislovskiy | G07C 5/008 |
| 2019/0039634 A1* | 2/2019 | Tokumaru | B61L 27/16 |
| 2019/0195645 A1* | 6/2019 | Terahata | B60L 53/68 |
| 2019/0279119 A1* | 9/2019 | Hirose | G06Q 50/30 |
| 2019/0318253 A1* | 10/2019 | Maekawa | G06F 30/20 |
| 2019/0364492 A1* | 11/2019 | Azizi | H04W 24/08 |
| 2019/0377365 A1* | 12/2019 | Terahata | G06Q 20/14 |
| 2019/0383622 A1* | 12/2019 | Aich | G01C 21/3423 |
| 2020/0311851 A1* | 10/2020 | Ikeda | G06Q 50/10 |
| 2021/0031767 A1 | 2/2021 | Kim | |
| 2021/0311499 A1* | 10/2021 | Okazaki | G06Q 50/30 |

FOREIGN PATENT DOCUMENTS

| | | | | |
|---|---|---|---|---|
| JP | 2000-264210 A | | 9/2000 | |
| JP | 2005-222144 A | | 8/2005 | |
| JP | 2015-049629 A | | 3/2015 | |
| WO | WO-2018217526 A1 * | 11/2018 | | B60W 50/0098 |
| WO | WO-2018217526 A1 * | 2/2019 | | G01C 21/34 |
| WO | WO-2019032519 A1 * | 2/2019 | | G01C 21/3438 |
| WO | WO-2019105714 A1 * | 6/2019 | | B60W 60/0025 |

OTHER PUBLICATIONS

Csiszár, Csaba, and Azamat Zarkeshev. "Demand-capacity coordination method in autonomous public transportation." Transportation research procedia 27 (2017): 784-790. (Year: 2017).*

Hickman, Mark D., and Nigel HM Wilson. "Passenger travel time and path choice implications of real-time transit information." Transportation Research Part C: Emerging Technologies 3.4 (1995): 211-226. (Year: 1995).*

Aug. 5, 2022 Office Action issued in U.S. Appl. No. 17/215,002.
Feb. 17, 2023 Office Action issued in U.S. Appl. No. 17/215,002.

* cited by examiner

|   | a | b | c | d | a | b |
|---|---|---|---|---|---|---|
| A | 7:00 ⑤ | 7:05 | 7:10 | 7:15 | 7:20 | 7:25 |
| B | ⑤ 6:55 | 7:00 | 7:05 | 7:10 | 7:15 | 7:20 |
| C | 6:50 | 6:55 | 7:00 | 7:05 | 7:10 | 7:15 |
| D | 6:45 | 6:50 | 6:55 | 7:00 | 7:05 | 7:10 |

FIG. 4

FIRST CASE

| | a | b | c | d | a | b |
|---|---|---|---|---|---|---|
| A | 7:00 ②7:02 ⑤7:07 | | | 7:12 | 7:17 ④ | 7:22 |
| B | | 7:00 ③7:03 ⑤7:08 | | | 7:13 ④ | 7:18 |
| C | | | 7:00 ④7:04 ⑤7:09 | | ④ | 7:14 |
| D | | | | 7:00 | 7:05 ④ | 7:10 |
| E | | | | | 7:01 | 7:06 |

FIG. 8

SECOND CASE

| | a | b | c | d | a | b |
|---|---|---|---|---|---|---|
| A | 7:00 ⑤ 7:05 | | 7:10 ④ | 7:15 ④ | 7:20 | 7:25 |
| B | | 7:00 ⑥ 7:06 | | 7:11 ④ | 7:16 | 7:21 |
| C | | | 7:00 ⑦ 7:07 | | 7:12 ④ | 7:17 |
| D | | | | 7:00 ⑧ 7:08 | | 7:13 |
| E | | | | | 7:04 ④ | 7:09 |

THIRD CASE

| | a | b | c | d | a | b |
|---|---|---|---|---|---|---|
| A | 7:00 | 7:05 | 7:10 (6.6) | 7:15 (6.6) | 7:20 | 7:25 |
| B | | 7:00 (4) | 7:04 | 7:08 | 7:13 | 7:18 |
| C | | | 7:00 (4) | 7:04 (6.6) | 7:07 (3) | 7:12 (3) |
| D | | | | 7:00 (4) | 7:04 | 7:09 |

FIG. 15

FOURTH CASE

| | a | b | c | d | a | b |
|---|---|---|---|---|---|---|
| A | 7:00 ⑧ | 7:08 | 7:13 ⑥.⑥ | 7:18 ⑥.⑥ | 7:23 | 7:28 |
| B | | 7:00 ⑥ | 7:06 ⑥.⑥ | 7:11 ⑥.⑥ | 7:16 | 7:21 |
| C | | | 7:00 | 7:05 | 7:10 ③ | 7:15 ③ |
| D | | | | 7:00 ⑦ | 7:07 | 7:12 |

OPERATION MANAGEMENT APPARATUS OF VEHICLE, OPERATION MANAGEMENT METHOD, AND TRANSPORTATION SYSTEM

CROSS REFERENCE TO RELATED APPLICATION

This application claims priority to Japanese Patent Application No. 2020-066593 filed on Apr. 2, 2020, which is incorporated herein by reference in its entirety including the specification, claims, drawings, and abstract.

TECHNICAL FIELD

The present disclosure relates to an operation management apparatus for managing operations of a plurality of vehicles which travel autonomously along a prescribed travel path, a method of managing an operation, and a transportation system having the operation management apparatus.

BACKGROUND

In recent years, transportation systems which use a vehicle capable of autonomous travel have been proposed. For example, JP 2000-264210 A discloses a vehicle transportation system which uses a vehicle which can travel autonomously along a dedicated path. This vehicle transportation system comprises a plurality of vehicles which travel along the dedicated path, and a supervision and control system which enables operations of the plurality of vehicles. The supervision and control system transmits a departure command and a course command to the vehicle according to an operation plan. The supervision and control system also increases or decreases the number of vehicles according to a transportation demand.

Here, the increase in the number of vehicles is performed when the transportation demand increases. However, in JP 2000-264210 A, there is no specific rule for increasing the number of vehicles, such as, for example, where the vehicle is to be added. In the technique of JP 2000-264210 A, there is a possibility that a new vehicle cannot be added at an appropriate position, and the increase in the transportation demand cannot be effectively handled. In this case, passengers are concentrated in some of the vehicles, and a delay may be caused. As a result, a wait time of the vehicle at a station and a movement time between stations increase, thereby reducing convenience of the transportation system.

An advantage of the present disclosure lies in provision of an operation management apparatus, a method of managing the operation, and a transportation system which can further enhance convenience of the transportation system.

SUMMARY

According to one aspect of the present disclosure, there is provided an operation management apparatus comprising: a plan generator that generates a travel plan for each of a plurality of vehicles which form a vehicle line and which travel autonomously along a prescribed travel path; a communication device that transmits the travel plan to a corresponding vehicle; an operation monitoring unit that acquires an operation status of the vehicle; and a judging unit that judges necessity of addition of a vehicle to the vehicle line and elimination of a vehicle from the vehicle line based on the operation status, wherein, when it is judged that the addition of the vehicle is necessary, the plan generator determines a position of addition of a new vehicle in the vehicle line based on at least one of travel information which is information related to a traveling state or passenger information which is information related to a passenger, transmitted from each of the plurality of vehicles, and generates a travel plan for adding the new vehicle at the position of addition.

Because the position of addition of the new vehicle is determined based on at least one of the travel information or the passenger information, it is possible to quickly complete adjustment of an operation interval, and to effectively suppress the delay of the vehicle or an overflow. As a result, the convenience of the transportation system can be further enhanced.

According to another aspect of the present disclosure, in the operation management apparatus, the travel information may include a traveling position of the vehicle, and the plan generator may calculate an operation interval of the plurality of vehicles based on the traveling position, and may determine as the position of addition of the new vehicle a position immediately before a vehicle having a largest operation interval with a preceding vehicle.

With such a configuration, adjustment of the operation interval can be completed quickly, and the delay of the vehicle and the overflow can be effectively suppressed.

According to another aspect of the present disclosure, in the operation management apparatus, the travel information may include possibility/impossibility of a continued operation of the vehicle, and, when there is a non-operable vehicle, which is unable to continue operating, in the vehicle line, the plan generator may determine as the position of addition a position between two vehicles traveling immediately before and immediately after the non-operable vehicle.

With such a configuration, unevenness of the operation interval due to occurrence of the non-operable vehicle can be resolved quickly, and the delay of the vehicle and the overflow can be effectively suppressed.

According to another aspect of the present disclosure, in the operation management apparatus, the passenger information may include at least a number of passengers of the vehicle, and the plan generator may estimate a magnitude relationship of disembarkation times of the passengers among the plurality of vehicles based on the passenger information, and may determine as the position of addition a position immediately before a vehicle having a largest disembarkation time.

When the disembarkation requires a longer time, the delay and the overflow tend to occur more frequently. By setting as the position of addition a position immediately before the vehicle which requires long time for disembarkation, the delay of the vehicle and the overflow can be effectively suppressed.

According to another aspect of the present disclosure, in the operation management apparatus, the passenger information may include at least a number of passengers of the vehicle, and the plan generator may calculate an embarkation percentage indicating a percentage of passengers in relation to a capacity of each vehicle based on the passenger information, and may determine as the position of addition a position immediately before a vehicle having a largest embarkation percentage.

When the embarkation percentage is high, the delay and the overflow tend to occur more frequently. By setting as the position of addition a position immediately before the vehicle having a high embarkation percentage, the delay of the vehicle and the overflow can be effectively suppressed.

According to another aspect of the present disclosure, in the operation management apparatus, the travel information may include a traveling position of the vehicle, the passenger information may include at least a number of passengers of the vehicle, and the plan generator may calculate an operation interval of the plurality of vehicles based on the traveling position, a disembarkation time of the passenger among a plurality of vehicles in front and rear based on the passenger information, and an embarkation percentage indicating a percentage of the passengers in relation to a capacity of each vehicle based on the passenger information, may calculate a degradation risk by performing a weighted addition, with a predetermined ratio, of the calculated operation interval with a preceding vehicle, the calculated disembarkation time, and the calculated embarkation percentage, and may determine as the position of addition a position immediately before a vehicle having a highest degradation risk.

By comprehensively taking into consideration a plurality of elements, the vehicle can be added at a more appropriate position. As a result, the delay of the vehicle and the overflow can be effectively suppressed.

According to another aspect of the present disclosure, in the operation management apparatus, when it is judged that the addition of the vehicle is necessary, the plan generator may generate a travel plan in which a reference vehicle, which is one of a plurality of vehicles which form a vehicle line before the addition of the vehicle, is caused to travel at a first scheduled velocity, and may generate a travel plan in which each of vehicles other than the reference vehicle is caused to travel at a scheduled velocity which is temporarily increased or temporarily decreased from the first scheduled velocity.

With the reference vehicle as a reference, by increasing or decreasing the velocities of the other vehicles in relation to the velocity of the reference vehicle, a calculation for adjusting the interval of the vehicles can be simplified, and the operation interval of the vehicles can be appropriately adjusted. With the appropriate adjustment of the operation interval, the convenience of the transportation system can be further enhanced.

According to another aspect of the present disclosure, there is provided a method of managing an operation, the method comprising: generating a travel plan for each of a plurality of vehicles which form a vehicle line and which travel autonomously along a prescribed travel path; transmitting the travel plan to a corresponding vehicle; acquiring an operation status of the vehicle; judging necessity of addition of a vehicle to the vehicle line and elimination of a vehicle from the vehicle line based on the operation status; and, when it is judged that the addition of the vehicle is necessary, determining a position of addition of a new vehicle in the vehicle line based on at least one of travel information which is information related to a traveling state or passenger information which is information related to a passenger, transmitted from each of the plurality of vehicles, and generating a travel plan for adding the new vehicle at the position of addition.

Because the position of addition of the new vehicle is determined based on at least one of the travel information or the passenger information, an adjustment of an operation interval can be completed quickly, and a delay of a vehicle and an overflow can be effectively suppressed. As a result, the convenience of the transportation system can be further enhanced.

According to another aspect of the present disclosure, there is provided a transportation system comprising: a vehicle line formed from a plurality of vehicles which travel autonomously along a prescribed travel path; and an operation management apparatus that manages operations of the plurality of vehicles, wherein each of the vehicles transmits, to the operation management apparatus, at least one of travel information which is information related to a traveling state of the vehicle or passenger information which is information related to a passenger, the operation management apparatus comprises: a plan generator which generates a travel plan for each of the plurality of vehicles; a communication device which transmits the travel plan to a corresponding vehicle; an operation monitoring unit which acquires an operation status of the vehicle; and a judging unit which judges necessity of addition of a vehicle to the vehicle line and elimination of a vehicle from the vehicle line based on the operation status, and, when it is judged that the addition of the vehicle is necessary, the plan generator determines a position of addition of a new vehicle in the vehicle line based on at least one of the travel information or the passenger information transmitted from each of the plurality of vehicles, and generates a travel plan for adding the new vehicle at the position of addition.

Because the position of addition of the new vehicle is determined based on at least one of the travel information or the passenger information, an adjustment of an operation interval can be completed quickly, and a delay of the vehicle and an overflow can be effectively suppressed. As a result, the convenience of the transportation system can be further enhanced.

According to the operation management apparatus, the method of managing the operation, and the transportation system of the present disclosure, the convenience of the transportation system can be further enhanced.

BRIEF DESCRIPTION OF DRAWINGS

Embodiment(s) of the present disclosure will be described based on the following figures, wherein:

FIG. 4 is a diagram showing an example of a travel plan used in the transportation system of FIG. 1;
FIG. 8 is a diagram showing an example of a travel plan generated in the first case;
FIG. 11 is a diagram showing an example of a travel plan generated in the second case;
FIG. 15 is a diagram showing an example of a travel plan generated in the third case;

FIG. 18 is a diagram showing an example of a travel plan generated in the fourth case;

DESCRIPTION OF EMBODIMENTS

Figure 1:
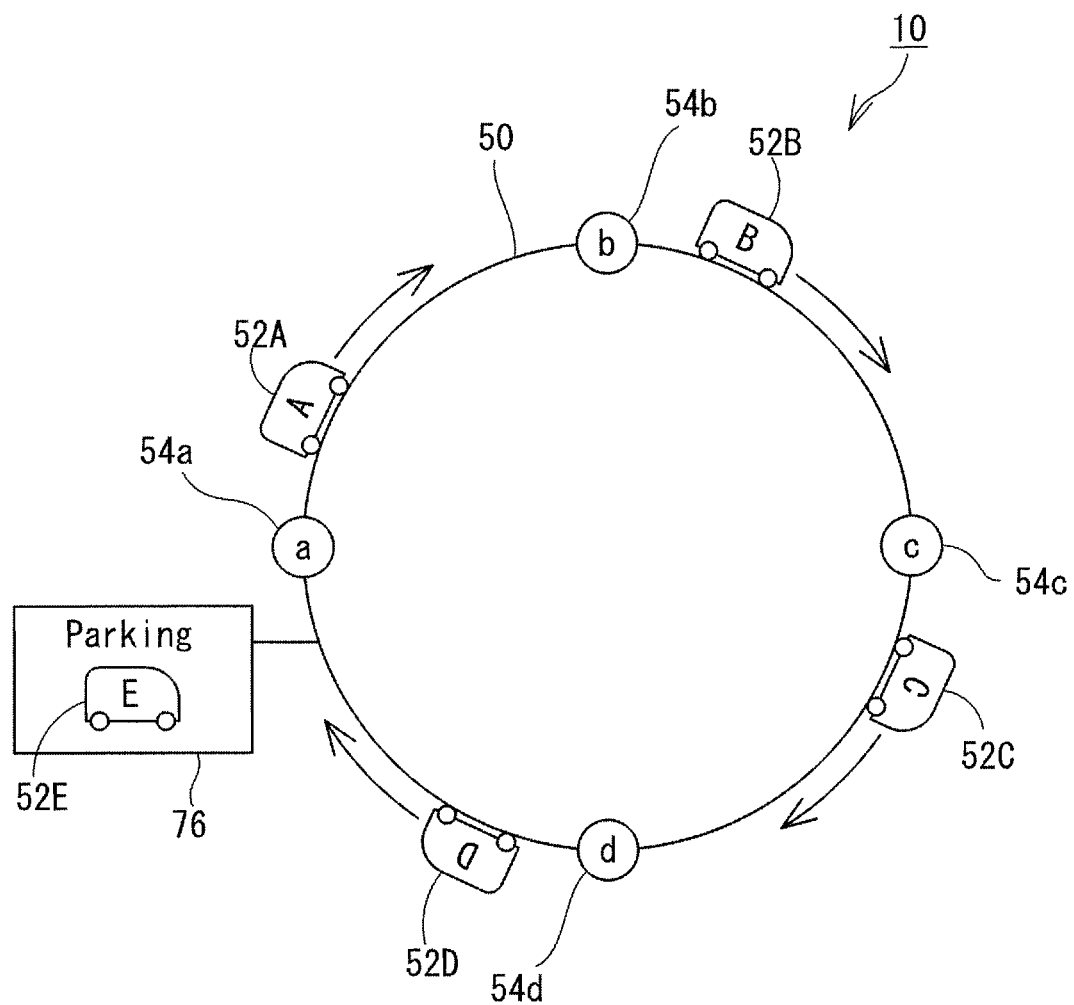
FIG. 1 is a conceptual diagram of a transportation system.
Figure 2:
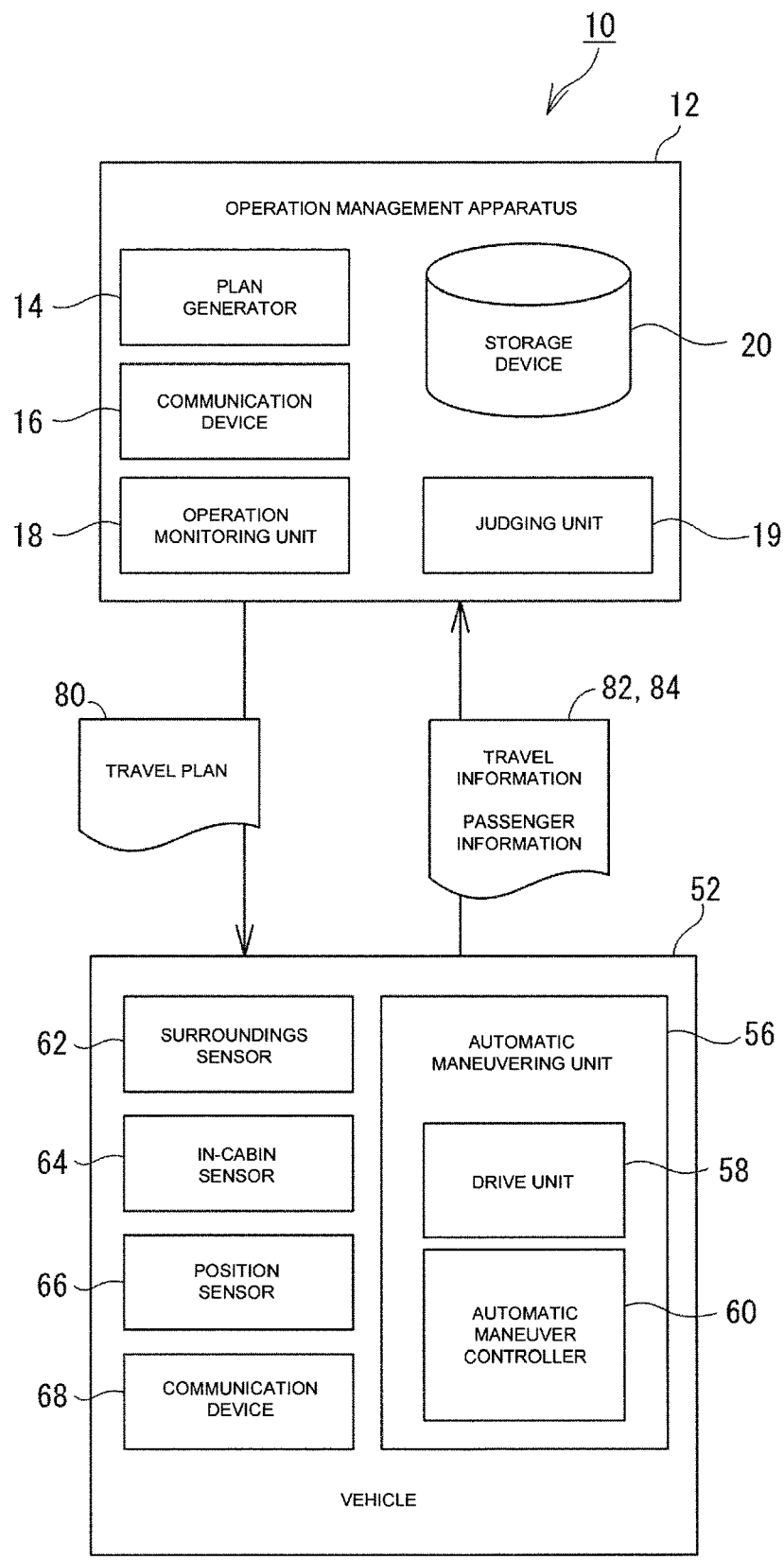
FIG. 2 is a block diagram of the transportation system.
Figure 3:
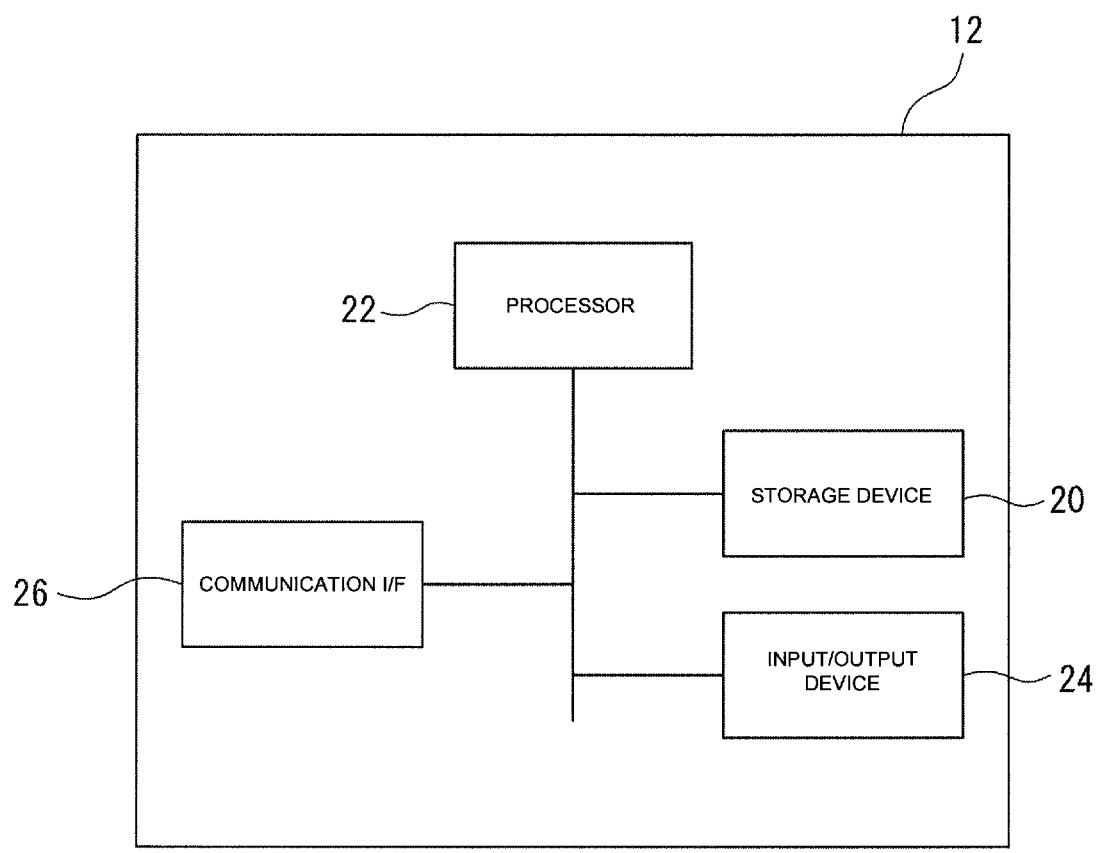
FIG. 3 is a block diagram showing a physical structure of an operation management apparatus.

A structure of a transportation system 10 will now be described with reference to the drawings. FIG. 1 is a conceptual diagram of the transportation system 10, and FIG. 2 is a block diagram of the transportation system 10. FIG. 3 is a block diagram showing a physical structure of an operation management apparatus 12.

The transportation system 10 is a system for transporting an unspecified large number of users along a travel path 50 which is prescribed. The transportation system 10 includes a plurality of vehicles 52A~52D which can travel autonomously along the travel path 50. In addition, a plurality of stations 54a~54d are set along the travel path 50. In the following, when the plurality of vehicles 52A 52D are not distinguished, the suffixed letter will be omitted, and the vehicle will be referred to simply as a "vehicle 52". Similarly, when the plurality of stations 54a~54d are not distinguished, the station will be referred to simply as a "station 54".

The plurality of vehicles 52 travel in one direction in laps along the travel path 50, and form one vehicle line. Each vehicle 52 temporarily stops at each station 54. The user embarks the vehicle 52 or disembarks from the vehicle 52 at the timing when the vehicle 52 is temporarily stopped. Therefore, in the present embodiment, each vehicle 52 functions as an autobus for transporting the unspecified large number of users from one station 54 to another station 54. An operation management apparatus 12 (not shown in FIG. 1; refer to FIGS. 2 and 3) manages operations of the plurality of vehicles 52. In the present embodiment, the operation management apparatus 12 controls the operations of the plurality of vehicles 52 so that the vehicles 52 operate with equal intervals. An equal-interval operation refers to an operation form in which a departure interval of the vehicles 52 at each station 52 is uniform. Therefore, the equal-interval operation is, for example, an operation form in which, when a departure interval at the station 54a is 5 minutes, the departure intervals at the other stations 54b, 54c, and 54d are also 5 minutes.

In addition, as will be described later in detail, the operation management apparatus 12 adds a new vehicle 52 to the vehicle line or eliminates a vehicle 52 from the vehicle line according to an increase or a decrease of a transportation demand. A wait position 76 is provided near the travel path 50, for the waiting of the vehicle 52 to be added or the vehicle 52 which has been eliminated.

Elements of the transportation system 10 will now be described in detail. The vehicle 52 travels autonomously according to a travel plan 80 provided from the operation management apparatus 12. The travel plan 80 defines a travel schedule of the vehicle 52. In the present embodiment, as will be described later in detail, the travel plan 80 defines departure timings of the vehicle 52 at the stations 54a~54d. The vehicle 52 travels autonomously such that the vehicle 52 can depart at the departure timing determined in the travel plan 80. That is, judgment of a travel velocity between stations 54, stopping at a signal light or the like, necessity of passing of other vehicles, or the like are all executed on the side of the vehicle 52.

As shown in FIG. 2, the vehicle 52 has an automatic maneuvering unit 56. The automatic maneuvering unit 56 can be primarily divided into a drive unit 58 and an automatic maneuver controller 60. The drive unit 58 is a basic unit for causing the vehicle 52 to travel, and includes, for example, a motor, a motive power transmission device, a braking device, a travel device, a suspension device, a steering device, or the like. The automatic maneuver controller 60 controls driving of the drive unit 58, to cause the vehicle 52 to travel autonomously. The automatic maneuver controller 60 is, for example, a computer including a processor and a memory. The "computer" includes a microcomputer in which a computer system is incorporated in one integrated circuit. The processor refers to a processor in a generalized sense, and includes a general-purpose processor (for example, a CPU (Central Processing Unit) or the like), and a dedicated processor (for example, a GPU (Graphics Processing Unit), an ASIC (Application Specific Integrated Circuit), an FPGA (Field Programmable Gate Array), a programmable logical device, or the like).

In order to enable the autonomous travel, the vehicle 52 is further equipped with a surroundings sensor 62 and a position sensor 66. The surroundings sensor 62 detects a periphery and surroundings of the vehicle 52, and includes, for example, a camera, a Lidar, a millimeter-wave radar, a sonar, a magnetic sensor, or the like. The automatic maneuver controller 60 recognizes, based on a detection result of the surroundings sensor 62, a type of an object around the vehicle 52, a distance to the object, a road surface indication on the travel path 50 (for example, a white line or the like), a traffic sign, or the like. The position sensor 66 detects a current position of the vehicle 52, and is, for example, GPS. A detection result by the position sensor 66 is also sent to the automatic maneuver controller 60. The automatic maneuver controller 60 controls acceleration/deceleration and steering of the vehicle 52 based on the detection results of the surroundings sensor 62 and the position sensor 66. A status of such control by the automatic maneuver controller 60 is transmitted to the operation management apparatus 12 as travel information 82. The travel information 82 includes a current position of the vehicle 52, and possibility/impossibility of continued operation of the vehicle 52. Therefore, when the operation of the vehicle 52 cannot be continued due to some reason, the impossibility of operation is communicated to the operation management apparatus 12.

The vehicle 52 is further equipped with an in-cabin sensor 64 and a communication device 68. The in-cabin sensor 64 is a sensor which detects a state of an inside of the vehicle 52, in particular, a number of and attributes of passengers. The attribute may include, for example, at least one of use/non-use of a wheelchair, use/non-use of a cane for visually impaired, use/non-use of a baby carriage, use/non-use of outfits, or an age group. The in-cabin sensor 64 is, for example, a camera which captures an image of the inside of the vehicle, a weight sensor which detects a total weight of the passengers, or the like. Information detected by the in-cabin sensor 64 is transmitted to the operation management apparatus 12 as passenger information 84.

The communication device 68 is a device which wirelessly communicates with the operation management apparatus 12. The communication device 68 can communicate, for example, via the Internet, through a wireless LAN such as WiFi (registered trademark), and mobile data communication provided by a cellphone company or the like. The communication device 68 receives the travel plan 80 from the operation management apparatus 12, and transmits the travel information 82 and the passenger information 84 to the operation management apparatus 12.

The operation management apparatus 12 monitors the operation status of the vehicle 52, and controls the operation of the vehicle 52 according to the operation status. Physically, as shown in FIG. 3, the operation management apparatus 12 is a computer having a processor 22, a storage device 20, an input/output device 24, and a communication interface (I/F) 26. The processor refers to a processor in a generalized sense, and includes a general-purpose processor (for example, a CPU), and a dedicated processor (for example, a GPU, an ASIC, an FPGA, a programmable logical device, or the like). The storage device 20 may include at least one of a semiconductor memory (for example, a RAM, a ROM, a solid-state drive, or the like) or a magnetic disk drive (for example, a hard disk drive). FIG. 3 shows the operation management apparatus 12 as a single computer, but alternatively, the operation management apparatus 12 may be formed from a plurality of computers which are physically separated from each other.

Functionally, as shown in FIG. 2, the operation management apparatus 12 comprises a plan generator 14, a communication device 16, an operation monitoring unit 18, a judging unit 19, and a storage device 20. The plan generator 14 generates the travel plan 80 for each of the plurality of vehicles 52. The plan generator 14 also corrects and re-generates the travel plan 80 which is once generated, depending on the operation status of the vehicle 52. The generation and the correction of the travel plan 80 will be described later in detail.

The communication device 16 is a device for wirelessly communicating with the vehicle 52, and can communicate via the Internet through, for example, WiFi or the mobile data communication. The communication device 16 transmits to the vehicle 52 the travel plan 80 which is generated or re-generated by the plan generator 14, and receives the travel information 82 and the passenger information 84 from the vehicle 52.

The operation monitoring unit 18 acquires the operation status of the vehicle 52 based on the travel information 82 transmitted from each vehicle 52. As described above, the travel information 82 includes the current position of the vehicle 52 and the possibility/impossibility of continued operation of the vehicle 52. Therefore, the operation monitoring unit 18 compares the position of the vehicle 52 with the travel plan 80, and calculates an amount of delay of the vehicle 52 with respect to the travel plan 80, an operation interval between the vehicles 52, and the like.

The judging unit 19 judges necessity of addition of a vehicle 52 to the vehicle line or elimination of a vehicle 52 from the vehicle line, based on the amount of delay calculated by the operation monitoring unit 18, the passenger information 84 and the travel information 82 transmitted from the vehicle 52, or the like. No particular limitation is imposed on the form of judgment. For example, when the amount of delay of the vehicle 52 with respect to the travel plan 80 is gradually increasing, it is highly likely that a transportation capability is insufficient in relation to the transportation demand. Thus, it may be judged that the addition of the vehicle 52 is necessary when the amount of delay is gradually increasing. Alternatively, in another form, it may be judged that the addition of the vehicle 52 is necessary when one of the vehicles 52 forming the vehicle line becomes unable to continue operating. Further alternatively, a percentage of passengers with respect to a capacity of the vehicle 52 may be calculated as an embarkation percentage based on the passenger information 84, and, it may be judged that the addition of the vehicle 52 is necessary when the embarkation percentage is excessively high, or that the elimination of the vehicle 52 is necessary when the embarkation percentage is excessively low. In any case, a result of the judgment of necessity of the addition or the elimination of the vehicle 52 by the judging unit 19 is sent to the plan generator 14. The plan generator 14 re-generates the travel plan 80 for each vehicle 52 when it is judged that the addition or the elimination of the vehicle 52 is necessary.

Next, generation and correction of the travel plan 80 in the operation management apparatus 12 will be described in detail. FIG. 4 is a diagram showing an example of the travel plan 80 used in the transportation system 10 of FIG. 1. In the example of FIG. 1, the vehicle line is formed from four vehicles 52A~52D, and four stations 54a~54d are placed at equal intervals along the travel path 50. In addition, in the present embodiment, an example configuration is described in which a time period required for one lap of the travel path 50 by each vehicle 52; that is, a lap time TC, is 20 minutes.

In this case, the operation management apparatus 12 generates the travel plan 80 such that the departure interval of the vehicles 52 at each station 54 is a time obtained by dividing the lap time TC by the number of the vehicles 52; that is, 20/4=5 minutes. As shown in FIG. 4, the travel plan 80 only records the departure timing at each station 54. For example, a travel plan 80D transmitted to the vehicle 52D records target times when the vehicle 52D is to depart from the stations 54a-54d, respectively.

In addition, the travel plan 80 only records a time schedule for one lap, and the travel plan 80 is transmitted from the operation management apparatus 12 to the vehicle 52 at a time when each vehicle 52 arrives at a particular station, for example, the station 54a. For example, the vehicle 52C receives, from the operation management apparatus 12, a travel plan 80C for one lap at a time when the vehicle 52C arrives at the station 54a (for example, 6:50), and the vehicle 52D receives, from the operation management apparatus 12, the travel plan 80D for one lap at a time when the vehicle 52D arrives at the station 54a (for example, 6:45).

Figure 5:
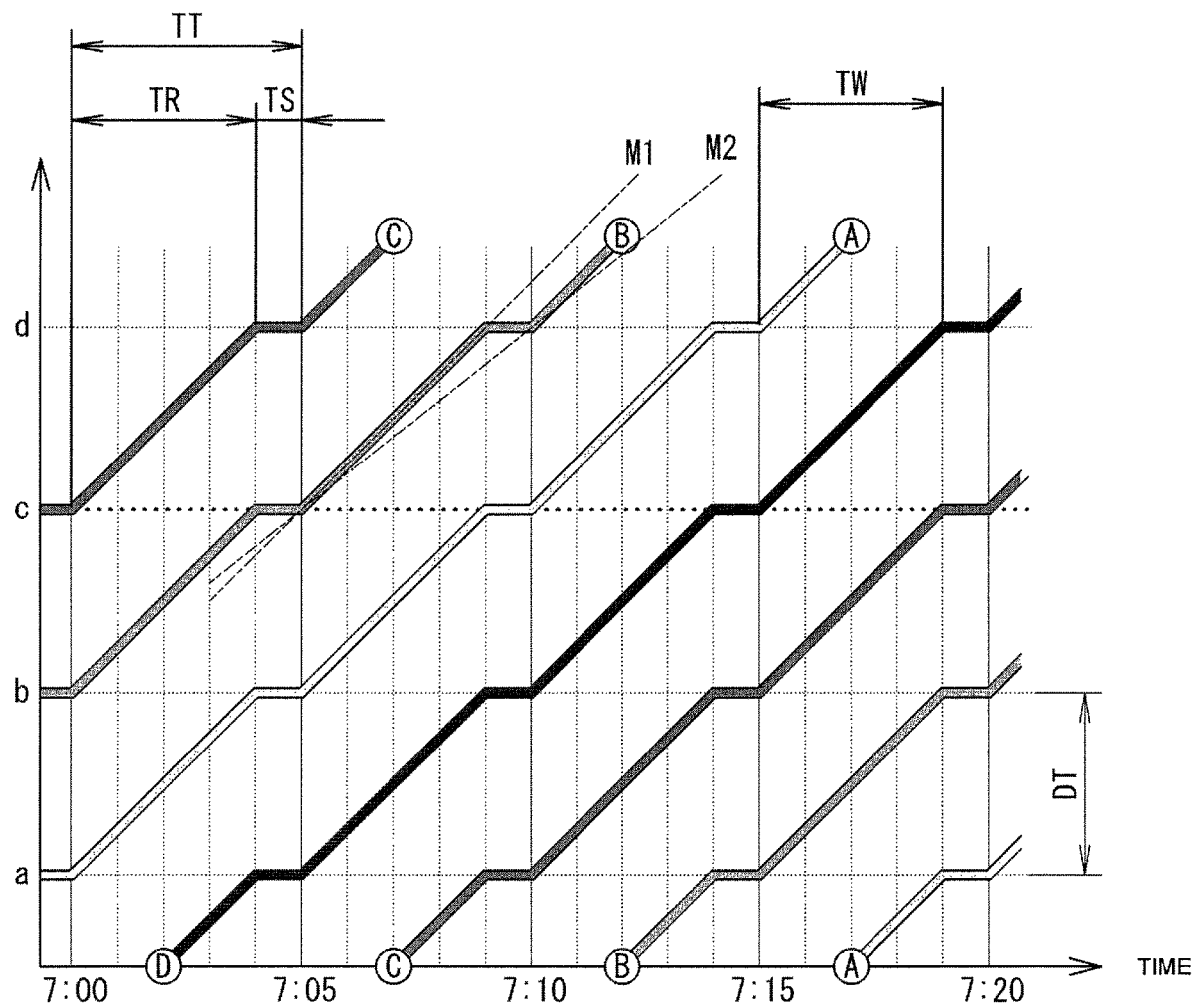
FIG. 5 is an operation timing chart of each vehicle which travels autonomously according to the travel plan of FIG. 4.

Each vehicle 52 travels autonomously according to the received travel plan 80. FIG. 5 is a timing chart of the vehicles 52A-52D which travel autonomously according to the travel plans 80 shown in FIG. 4. In FIG. 5, a horizontal axis shows the time, and a vertical axis shows a position of the vehicle 52. Before explaining the travel of the vehicle 52, meanings of various parameters used in the following description will be explained briefly.

In the following description, a distance between one station 54 and the next station 54 will be referred to as an "inter-station distance DT". A time period from a time when a vehicle 52 departs from one station 54 to a time when the vehicle 52 departs from the next station 54 will be referred to as an "inter-station required time TT", and a time period for the vehicle 52 to stop at the station 54 for embarkation and disembarkation of the users will be referred to as a "stop time TS". Further, a time period from departure from one station 54 to arrival to the next station 54; that is, a time obtained by subtracting the stop time TS from the inter-station required time TT, will be referred to as an "inter-station travel time TR".

A value obtained by dividing a movement distance by a movement time including the stop time TS will be referred to as a "scheduled velocity VS", and a value obtained by dividing the movement distance by a movement time excluding the stop time TS will be referred to as an "average travel velocity VA". A slope of a line M1 of FIG. 5 shows the average travel velocity VA, and a slope of a line M2 of FIG. 5 shows the scheduled velocity VS.

According to the travel plans 80 of FIG. 4, after the vehicle 52A departs from the station 54a at 7:00, the vehicle 52A must depart from the station 54b at 7:05, which is 5 minutes later. The vehicle 52A controls the average travel velocity VA so that the movement from the station 54a to the station 54b, and the embarkation and the disembarkation of users, are completed within this 5-minute period.

More specifically, the vehicle 52 stores, in advance, a standard stop time TS required for embarkation and disembarkation of the users, as a planned stop time TSp. The vehicle 52 calculates an arrival target time to the station 54 by subtracting the planned stop time TSp from the departure time at the station 54 determined in the travel plan 80. For example, when the planned stop time TSp is one minute, the arrival target time of the vehicle 52A to the station 54b is 7:04. The vehicle 52 controls its travel velocity so that the vehicle 52 can arrive at the next station 54 by the arrival target time thus calculated.

When a transportation demand becomes excessively high in comparison to a transportation capability of the vehicle line, a degree of crowdedness of the vehicle 52 may be increased, and comfortability of the users may be degraded. In addition, when the transportation demand becomes excessively high, the vehicle 52 may be delayed with respect to the travel plan 80, resulting in elongation of the time required for movement, and consequent reduction of convenience of the transportation system 10. On the contrary, when the transportation demand becomes excessively low in comparison to the transportation capability of the vehicle line, a usage efficiency of the vehicles 52 is reduced. Thus, as described above, the judging unit 19 judges necessity of the addition of a vehicle 52 or the elimination of a vehicle 52 based on the transportation demand or the like.

When it is judged that the addition of the vehicle 52 is necessary, the plan generator 14 transmits a travel plan 80 to a new vehicle, for entry of the new vehicle into the travel path 50. With this process, the new vehicle 52 is added to the vehicle line. In an example configuration shown in FIG. 6, a new vehicle 52E is added between the vehicle 52A and the vehicle 52D.

However, if the new vehicle 52 is simply added, the operation intervals of the plurality of vehicles 52 become uneven. In the example configuration of FIG. 6, immediately after the addition of the vehicle 52E, the operation interval between the vehicle 52E and the vehicle 52A is smaller than the operation interval between the vehicle 52A and the vehicle 52B. Thus, the plan generator 14 corrects and re-generates the travel plans 80 of the existing vehicles 52A-52D when the new vehicle 52E is added to the vehicle line, so that the operation becomes close to the equal-interval operation. Similarly, when it is judged that the elimination of the vehicle 52 is necessary, the plan generator 14 corrects and re-generates the travel plans 80 of the plurality of vehicles 52 to reach the equal-interval operation. In both of the cases in which the vehicle 52 is added or the vehicle 52 is eliminated, the plan generator 14 sets one of the plurality of vehicles 52 as a reference vehicle, and causes velocities of the vehicles 52 other than the reference vehicle to be temporarily increased or temporarily decreased in comparison to the reference vehicle, so that the operation becomes close to the equal-interval operation. This process will be described below with reference to specific example configurations.

Figure 7:
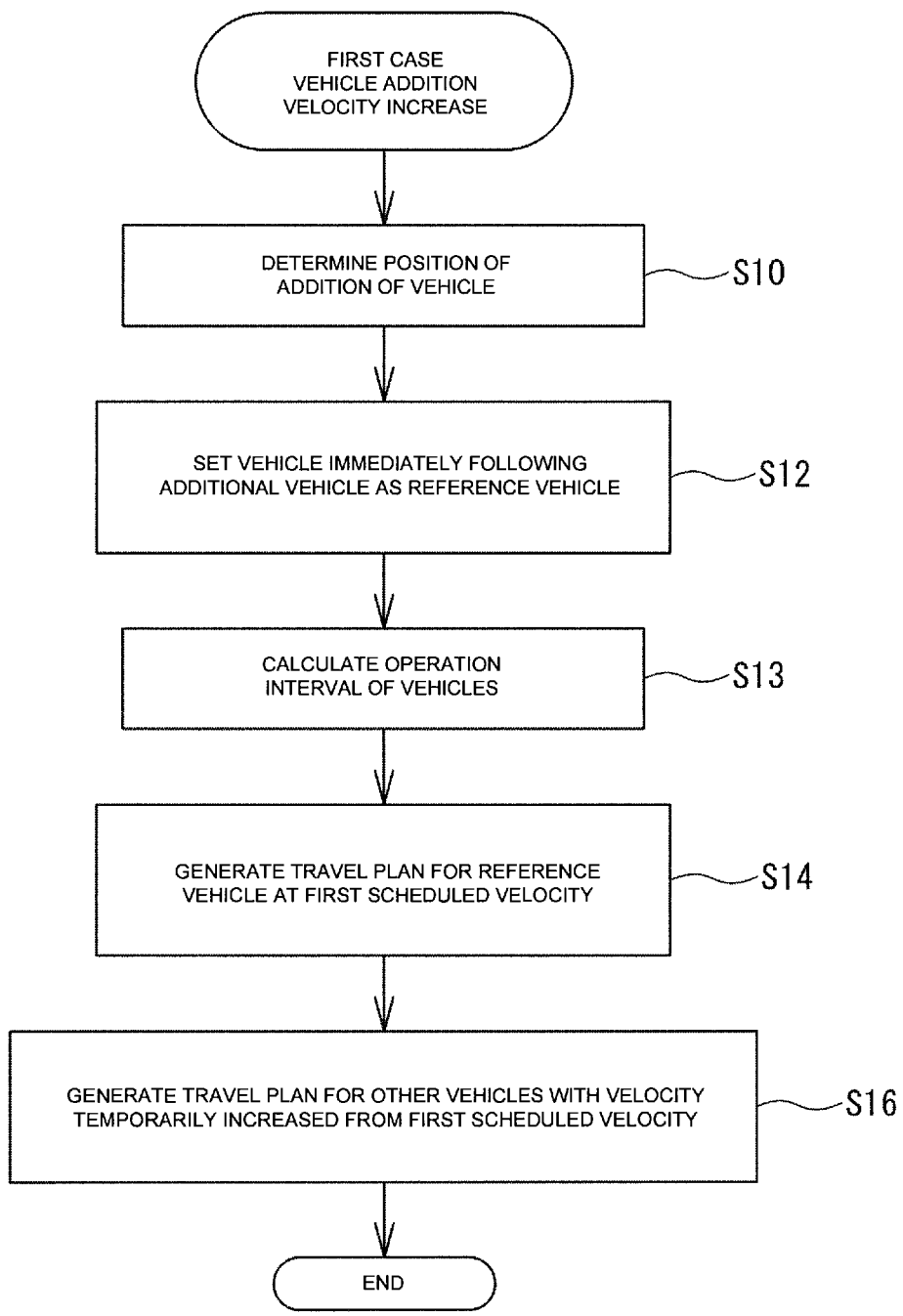
FIG. 7 is a flowchart showing a flow of re-generation of a travel plan in a first case.

First, a first case will be described in which it is judged that the addition of the vehicle 52 is necessary, and the velocities of the vehicles 52 other than the reference vehicle are caused to temporarily be increased. FIG. 7 is a flowchart showing a flow of generation of the travel plan 80 in the first case. FIG. 8 is a diagram showing an example of the travel plan 80 which is re-generated.

When it is judged that the addition of the vehicle 52 is necessary, the plan generator 14 determines a position of addition of the vehicle 52 in the vehicle line (S10). Details of a flow of the determination of the position of addition will be described later. In the example configuration of FIG. 6, the position of addition of the vehicle 52E is immediately following the vehicle 52A and immediately preceding the vehicle 52D. Once the position of addition of the vehicle 52 is determined, the plan generator 14 sets as a reference vehicle a vehicle 52 which immediately follows the vehicle to be added (S12). In the example configuration of FIG. 6, the vehicle 52D immediately following the vehicle 52E to be added is set as the reference vehicle. Then, the plan generator 14 divides the lap time TC of the vehicle 52 by the number of the vehicles 52 after the addition, to thereby calculate the operation interval of the vehicles 52 (S13). In the example configuration of FIG. 6, the operation interval after the vehicle addition is 20/5=4 minutes.

Next, the plan generator 14 generates a travel plan 80 to cause the reference vehicle to travel at a first scheduled velocity VS1 (S14). Here, no particular limitation is imposed on the first scheduled velocity VS1, so long as the velocity is such that the vehicle 52 can travel safely within a range of not degrading the convenience for the user. In the example configuration of FIG. 8, the scheduled velocity VS which is set for the plurality of vehicles 52 before the addition of the vehicle 52E is set as the first scheduled velocity VS1. Therefore, in this case, the schedule velocity VS of the vehicle 52D which is the reference vehicle does not change before and after the addition of the vehicle 52. Thus, the travel plan 80 of the vehicle 52D also does not change before and after the addition of the vehicle 52.

Next, the plan generator 14 generates a travel plan 80 in which the velocity of each of the vehicles 52 other than the reference vehicle is temporarily increased from the first scheduled velocity VS1, in order to realize the equal-interval operation (S16). In the example configuration of FIG. 8, the scheduled velocity VS of each of the vehicles 52A 52C other than the vehicle 52D is temporarily increased from the first scheduled velocity VS1. For example, in the example configuration of FIG. 8, with the first scheduled velocity VS1, the inter-station required time TT is 5 minutes. On the other hand, for the vehicle 52A, immediately after the addition of the vehicle 52E, the inter-station required time TT is temporarily shortened to 2 minutes, and the scheduled velocity VS of the vehicle 52A is higher than the first scheduled velocity VS1. Similarly, for the vehicle 52B, immediately after the addition of the vehicle 52E, the inter-station required time TT is shortened to 3 minutes, and the scheduled velocity VS of the vehicle 52B is higher than the first scheduled velocity VS1.

Once the equal-interval operation is realized as a result of the velocity increase, the plurality of vehicles 52A~52E travel at the first scheduled velocity VS1. In the example configuration of FIG. 8, the plans are such that the vehicle 52A travels at the first scheduled velocity VS1 after departing from the station 54b, and the vehicle 52B travels at the first scheduled velocity VS1 after departing from the station 54c. The travel plan 80 re-generated in this manner is transmitted to each of the plurality of vehicles 52A~52E. Each of the vehicles 52 travels autonomously according to the re-generated travel plan 80.

Figure 9:
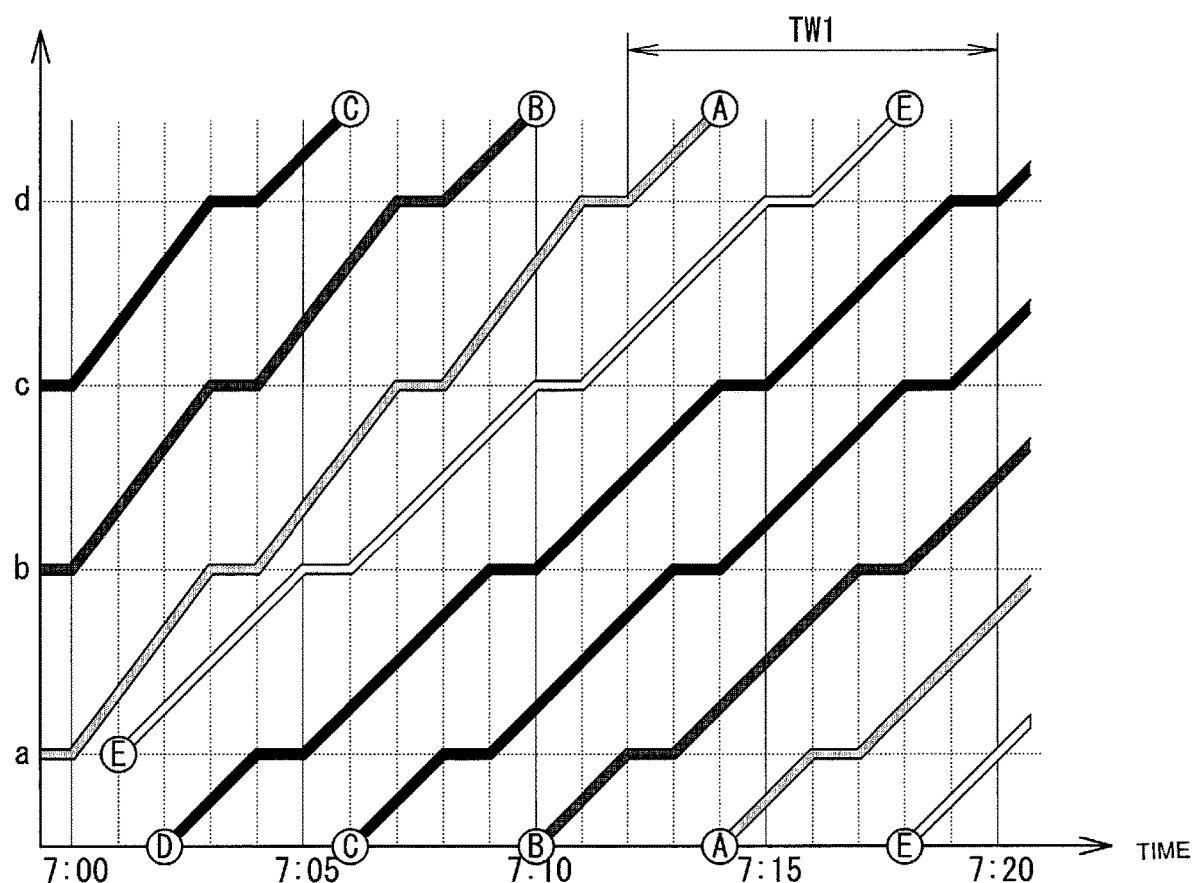
FIG. 9 is an operation timing chart of each vehicle which travels autonomously according to the travel plan of FIG. 8.

FIG. 9 is an operation timing chart of the vehicles 52A~52E which travel autonomously according to the travel plans of FIG. 8. As shown in FIG. 9, when the vehicle 52E is added, the velocities of the vehicles 52A~52C are temporarily increased in order to realize the equal-interval operation. With the temporary velocity increase, the operation interval of vehicles at each of the stations 54 is now 4 minutes.

In the example configuration of FIG. 8, the vehicle 52A is planned to travel from the station 54a to the station 54b in a very short time of 2 minutes. However, when it is difficult to actually achieve this plan, the travel of the vehicle 52A may be gradually made closer to the travel plan 80 in the process of traveling through a plurality of stations. For example, the vehicle 52A is planned to arrive at the station 54b at 7:02 and at the station 54c at 7:07. However, in the example configuration of FIG. 9, the vehicle 52A arrives at the station 54b at 7:04 and at the station 54c at 7:08, which are respectively 2 minutes and 1 minute delayed from the plan. However, ultimately, the vehicle 52A arrives at the station 54d at 7:12, and the delay with respect to the travel plan 80 is thus resolved.

Here, when the velocities of the vehicles 52 other than the reference vehicle are temporarily increased for adjusting the operation toward the equal-interval operation after the vehicle 52 is added, a maximum wait time TW at each station and the inter-station required time TT can be reduced in comparison to those before the addition. Specifically, for example, while in the example configuration of FIG. 5, the maximum wait time TW is 5 minutes and the inter-station required time TT is 5 minutes, in the example configuration of FIG. 9 showing a situation after the vehicle 52E is added, the maximum wait time TW is 4 minutes or less at all stations 54 and at all timings. Further, the inter-station required time TT is also 5 minutes or less. With such a configuration, the movement time and the wait time of the users who embark the vehicle can be maintained low, and the convenience for the user can be maintained high.

Figure 10:
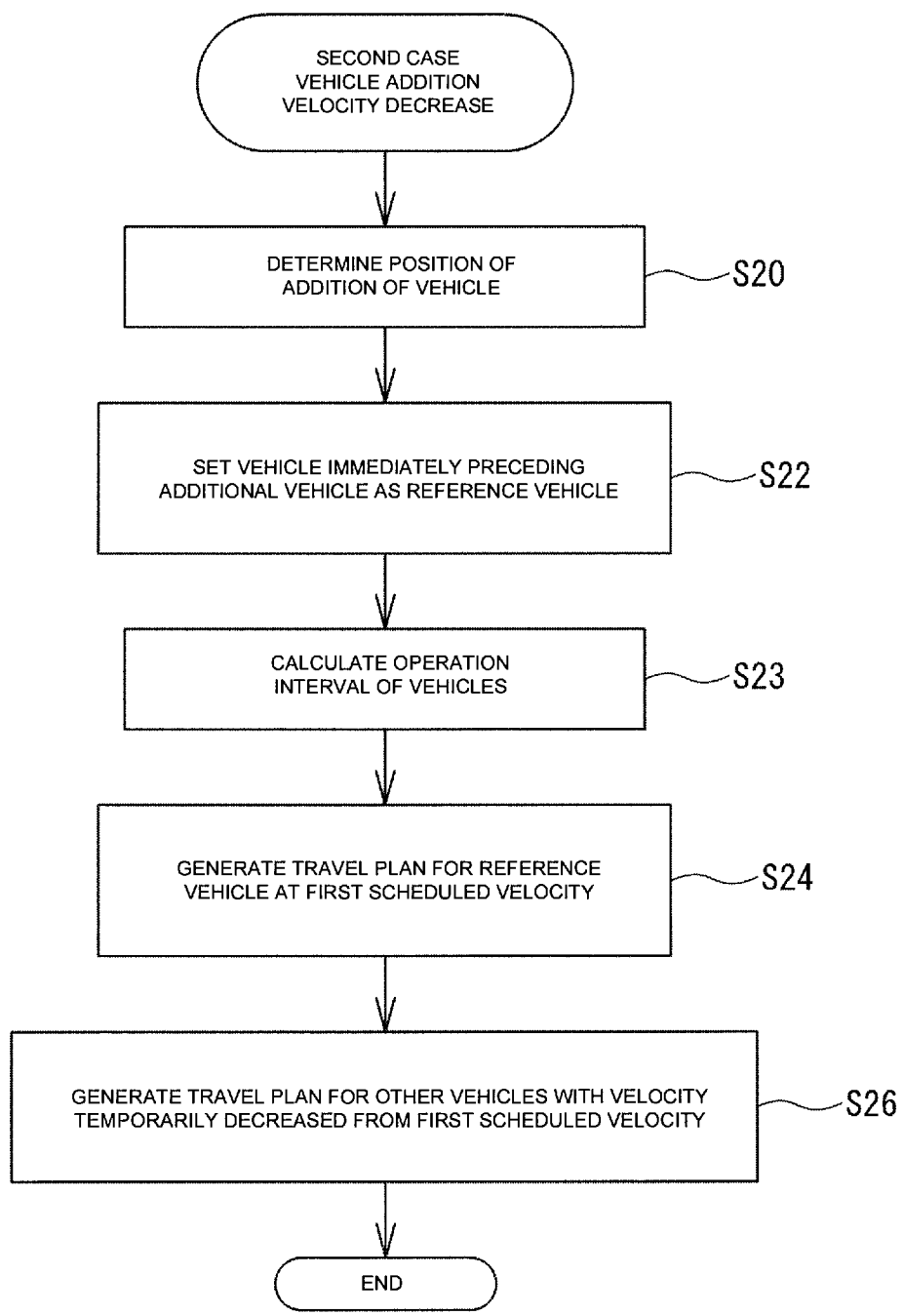
FIG. 10 is a flowchart showing a flow of generation of a travel plan in a second case.

Depending on a fuel consumption, a road surface condition, or the like, there may be cases in which the velocity of the vehicle 52 cannot be increased from the first scheduled velocity VS1. For example, when it is strongly requested to maintain the fuel consumption or the electric power consumption low, it becomes necessary to not accelerate the vehicle 52 beyond a certain velocity. Further, when the road surface is wet or frozen, the velocity increase is not appropriate. Thus, in such cases, the velocities of the vehicles 52 other than the reference vehicle may be temporarily decreased. FIG. 10 is a flowchart showing a flow of generation of the travel plan 80 in a second case in which it is judged that the addition of the vehicle 52 is necessary and the velocities of the vehicles 52 other than the reference vehicle are temporarily decreased. FIG. 11 is a diagram showing an example of the travel plan 80 thus generated.

Figure 6:
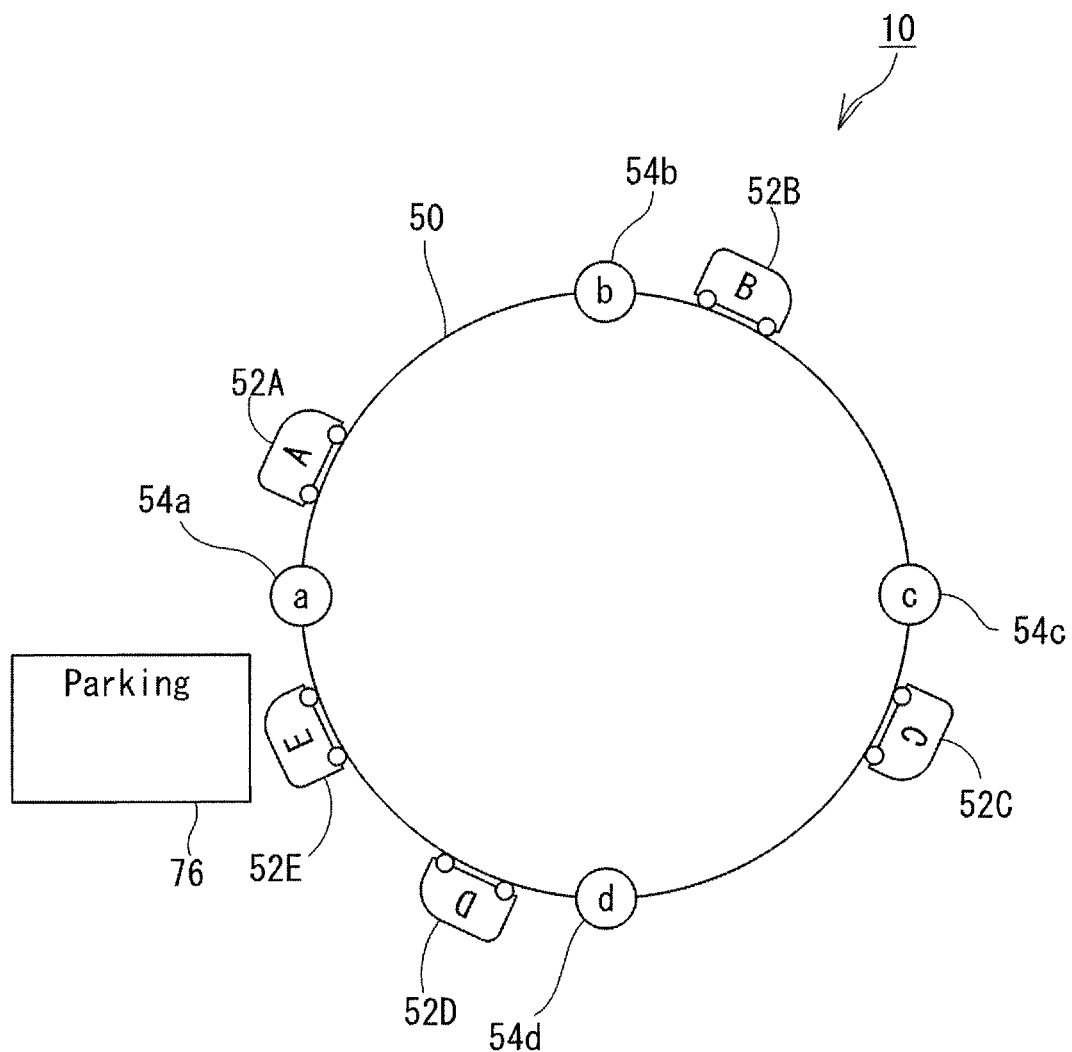
FIG. 6 is a diagram showing addition of a vehicle.

As shown in FIG. 10, when it is judged that the addition of the vehicle 52 is necessary, the plan generator 14 determines a position of addition of the vehicle 52 in the vehicle line (S20). Then, the plan generator 14 sets a reference vehicle (S22). In the second case, unlike the first case, a vehicle 52 immediately preceding the vehicle to be added is set as the reference vehicle. In the configuration of FIG. 6, the vehicle 52A immediately preceding the vehicle 52E to be added is set as the reference vehicle. Then, the plan generator 14 calculates the operation interval of the vehicles 52 at each station 54 (S23). In the example configuration of FIG. 6, the operation interval after the vehicle addition is 20/5=4 minutes.

Next, the plan generator 14 generates a travel plan 80 to cause the reference vehicle to travel at a first scheduled velocity VS1 (S24). In the example configuration of FIG. 11, the scheduled velocity VS which is set for the plurality of the vehicles 52 before the addition of the vehicle 52E is set as the first scheduled velocity VS1. Therefore, in this case, the scheduled velocity VS of the vehicle 52A which is the reference vehicle does not change before and after the addition of the vehicle 52. Thus, the travel plan 80 of the vehicle 52A does not change before and after the addition of the vehicle 52.

Next, the plan generator 14 generates a travel plan 80 in which the velocities of the vehicles 52 other than the reference vehicle are temporarily decreased from the first scheduled velocity VS1, in order to realize an equal-interval operation (S26). In the example configuration of FIG. 11, the scheduled velocity VS of each of the vehicles 52B 52D other than the vehicle 52A is temporarily decreased from the first scheduled velocity VS1. For example, in the example configuration of FIG. 11, with the first scheduled velocity VS1, the inter-station required time TT is 5 minutes. On the other hand, for the vehicle 52B, immediately after the addition of the vehicle 52E, the inter-station required time TT is temporarily extended to 6 minutes, and the scheduled velocity VS is decreased from the first scheduled velocity VS1. Similarly, for the vehicle 52C, immediately after the addition of the vehicle 52E, the inter-station required time TT is temporarily extended to 7 minutes, and the scheduled velocity VS is temporarily decreased from the first scheduled velocity VS1.

Once the equal-interval operation is realized as a result of the velocity decrease, the plurality of the vehicles 52B-52E are caused to travel at the first scheduled velocity VS1. In the example configuration of FIG. 11, the vehicle 52B is planned to travel at the first scheduled velocity VS1 after the vehicle 52B departs from the station 54c, and the vehicle 54C is planned to travel at the first scheduled velocity VS1 after the vehicle 52C departs from the station 54d. The travel plan 80 thus re-generated is transmitted to each of the plurality of vehicles 52A 52E. Each of the vehicles 52 travels autonomously according to the re-generated travel plan 80.

Figure 12:
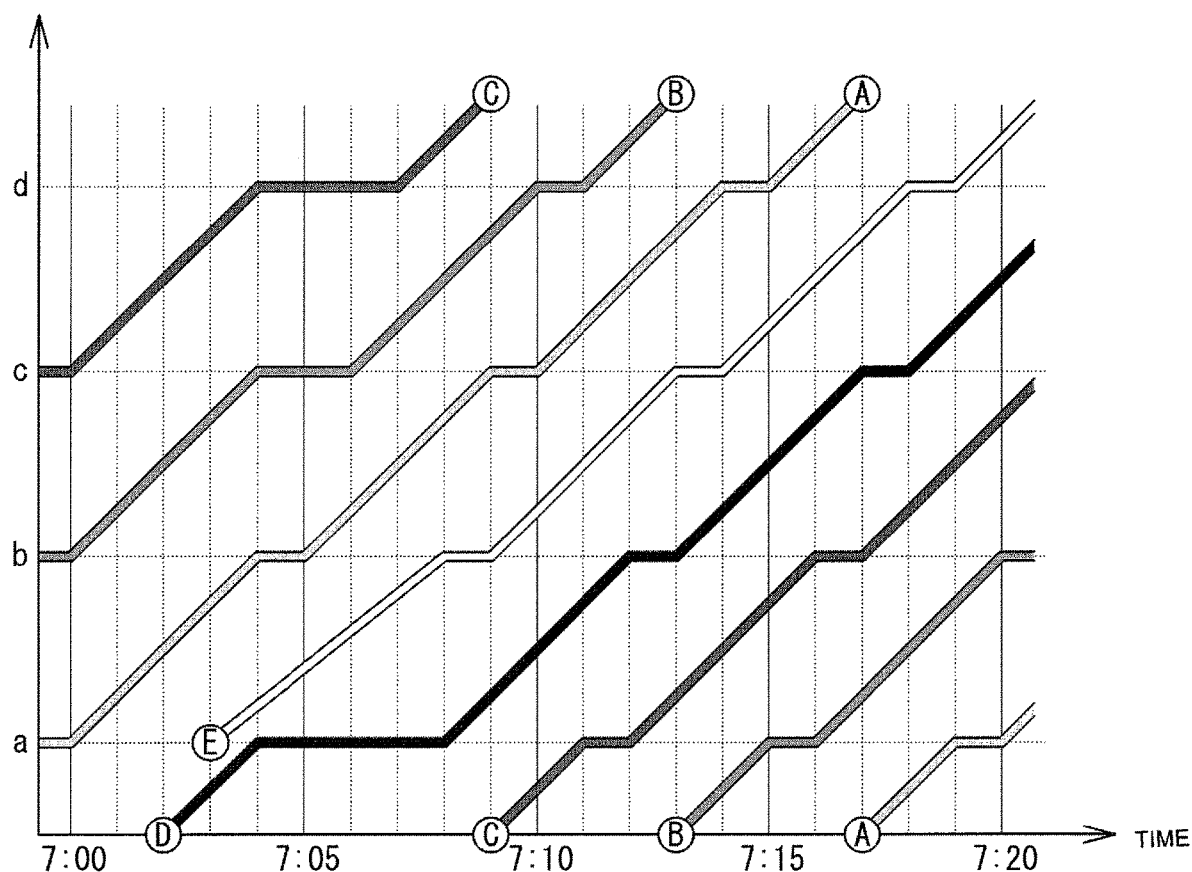
FIG. 12 is an operation timing chart of each vehicle which travels autonomously according to the travel plan of FIG. 11.

FIG. 12 is an operation timing chart of the vehicles 52A-52E which travel autonomously according to the travel plans 80 of FIG. 11. As shown in FIG. 12, when the vehicle 52E is added, the velocities of the vehicles 52B-52D are temporarily decreased in order to achieve the equal-interval operation. With the temporary decrease of velocity, the departure interval of the vehicles at each station 54 is ultimately set to 4 minutes.

In either the first case or the second case, the vehicle 52E to be added is added to the vehicle line before the adjustment of the intervals of the vehicles 52A-52D before the addition is completed. With such a configuration, it is possible to prevent the maximum wait time TW from becoming excessively large. That is, in order to add the vehicle 52E between the vehicles 52A and 52D, and to realize the equal-interval operation, the interval between the vehicles 52A and 52D must be adjusted such that an interval TW1 from departure of the vehicle 52A from one station 54 to departure of the vehicle 52D from the same station 54 is 8 minutes. In the example configuration of FIG. 9, after the vehicle 52A departs from the station 54d at 7:12, the vehicle 52D departs from the station 54d at 7:20. Thus, around 7:12, the interval adjustment between the vehicle 52A and the vehicle 52D is completed. If the vehicle 52E is added after this time of 7:12 when the interval adjustment is completed, the wait time of users who did not make in time for the vehicle 52A becomes excessively long in the period until the vehicle 52E is added (period from 7:00~7:12), and the convenience for the user is thus degraded. On the other hand, in the example configurations already described above, because the new vehicle 52E is added before the adjustment of intervals of the vehicles 52A-52D before the addition is completed, the increase in the wait time of the users who did not arrive in time for the vehicle 52A can be effectively suppressed, and the convenience for the user can be maintained high.

Figure 13:
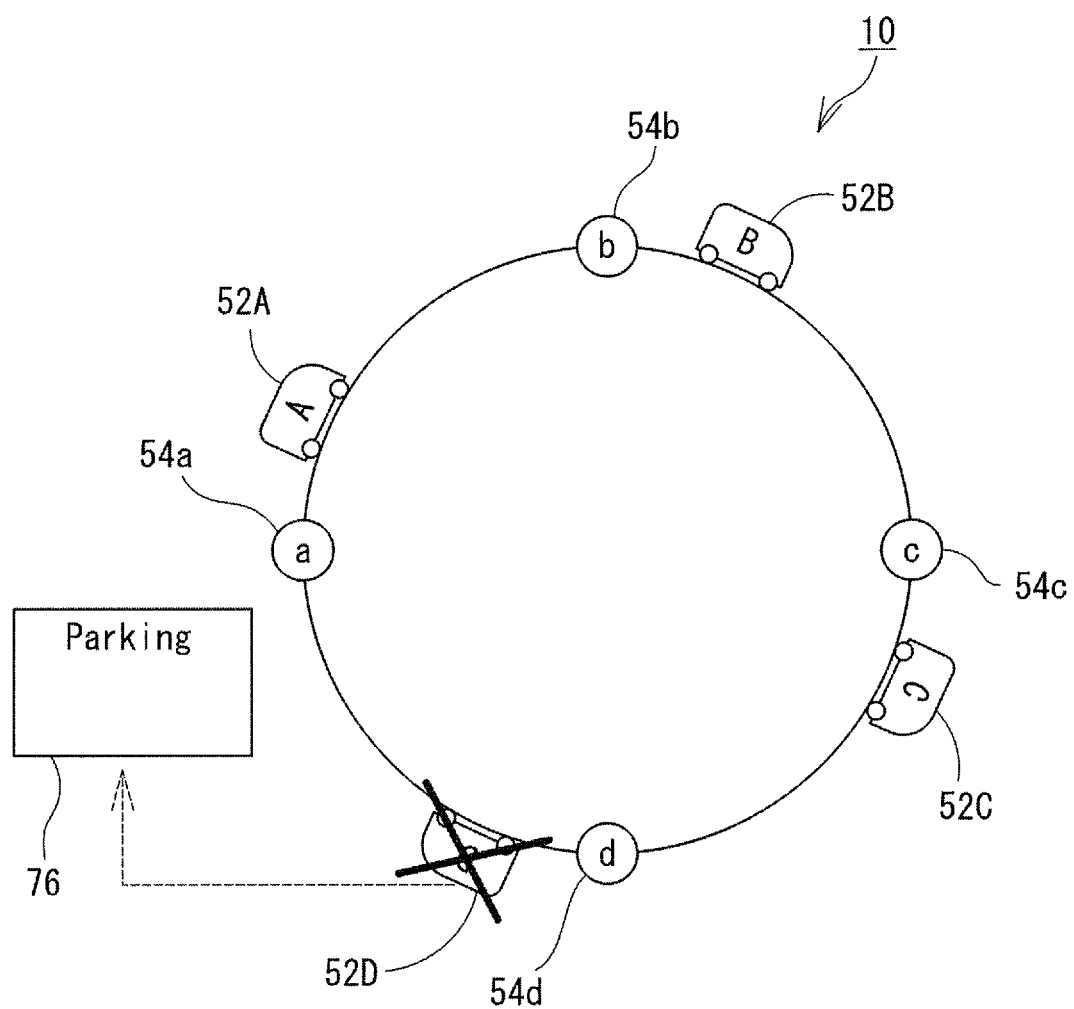
FIG. 13 is a conceptual diagram showing elimination of a vehicle from a plurality of vehicles which form a vehicle line.
Figure 14:
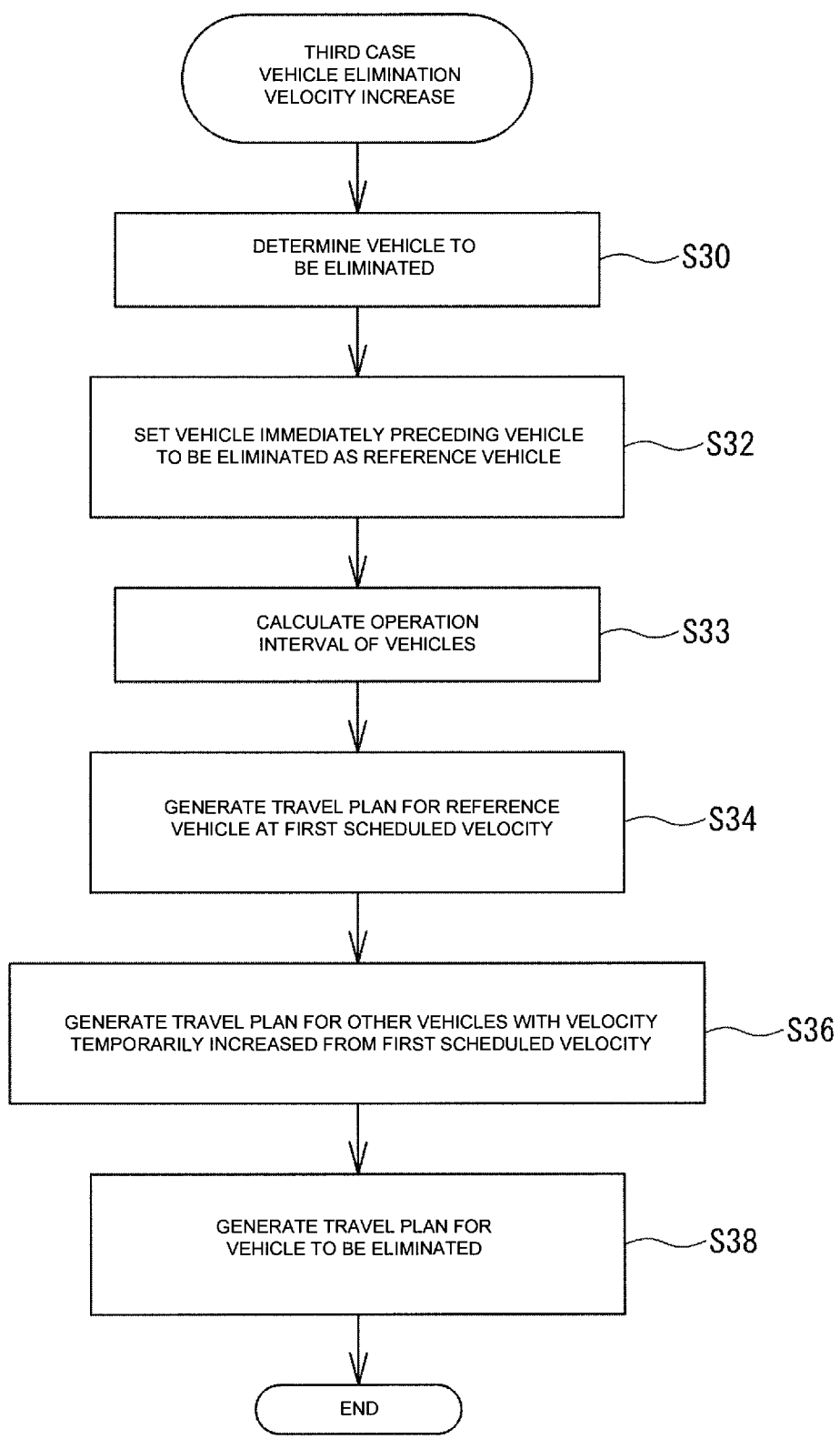
FIG. 14 is a flowchart showing a flow of generation of a travel plan in a third case.

Next, a third case will be described in which it is judged that the elimination of the vehicle 52 is necessary, and velocities of vehicles 52 other than the reference vehicle are temporarily increased. FIG. 13 is a conceptual diagram showing the elimination of a vehicle 52D from the plurality of vehicles 52 forming the vehicle line. FIG. 14 is a flowchart showing a flow of generation of the travel plan 80 in the third case, and FIG. 15 is a diagram showing an example of the travel plan 80 which is generated.

When it is judged that the elimination of the vehicle 52 is necessary, the plan generator 14 determines a vehicle 52 to be eliminated (S30). Here, when the vehicle 52 is to be eliminated, the transportation demand is sufficiently lowered, and almost no delay or the like of the vehicle 52 is caused. In this case, any of the vehicle 52 may be eliminated, without causing a significant adverse effect. Thus, the vehicle 52 to be eliminated can be determined by a relatively simple rule. For example, a vehicle 52 closest to the wait position 76 may be determined as the vehicle 52 to be eliminated. In the example configuration of FIG. 13, the vehicle 52D is eliminated according to this rule.

Once the vehicle 52 to be eliminated is determined, the plan generator 14 sets as a reference vehicle a vehicle 52 immediately preceding the vehicle 52 to be eliminated (S32). In the example configuration of FIG. 13, the vehicle 52A immediately preceding the vehicle 52D to be eliminated is set as the reference vehicle. Then, the plan generator 14 calculates an operation interval of the vehicles 52 at each station 54 by dividing the lap time TC of the vehicle 52 by the number of vehicles 52 after the elimination (S33). In the example configuration of FIG. 13, the operation interval after the vehicle elimination is 20/3≈6.6 minutes.

Next, the plan generator 14 generates a travel plan 80 to cause the reference vehicle to travel at a first schedule velocity VS1 (S34). In the example configuration of FIG. 15, the scheduled velocity VS which is set for the plurality of vehicles 52 before the elimination of the vehicle 52 is set as the first scheduled velocity VS1. Therefore, in this case, the scheduled velocity VS of the vehicle 52A which is the reference vehicle does not change before and after the elimination of the vehicle 52, and the travel plan 80 does not change before and after the elimination of the vehicle 52.

Next, the plan generator 14 generates a travel plan 80 for each of the vehicles 52 other than the reference vehicle and the vehicle 52 to be eliminated, in which the velocities are temporarily increased from the first scheduled velocity VS1 so as to achieve the equal-interval operation (S36). In the example configuration of FIG. 15, the scheduled velocities VS of the vehicles 52B and 52C, other than the vehicles 52A and 52D, are temporarily increased from the first scheduled velocity VS1. For example, in the example configuration of FIG. 15, with the first scheduled velocity VS1, the inter-station required time TT is 5 minutes. On the other hand, for the vehicle 52B, immediately after the determination of the elimination of the vehicle 52D, the inter-station required time TT is temporarily shortened to 4 minutes, and the scheduled velocity VS is higher than the first scheduled velocity VS1. Similarly, for the vehicle 52C, immediately after the determination of the elimination of the vehicle 52D, the inter-station required time TT is temporarily shortened to 4 minutes, and the scheduled velocity VS is higher than the first scheduled velocity VS1.

Once the operations of the vehicles 52A~52C which are not eliminated and which remain become the equal-interval operation as a result of the velocity increase, the plurality of vehicles 52B and 52C are caused to travel at the first scheduled velocity VS1. In the example configuration of FIG. 15, the vehicle 52B is planned to travel at the first scheduled velocity VS1 after the vehicle 52B departs from the station 54d.

Next, the plan generator 14 generates the travel plan 80 of the vehicle 52D to be eliminated (S38). For the vehicle 52 to be eliminated, a travel plan 80 is generated which does not interfere with the remaining vehicles 52A~52C. In addition, the vehicle 52D to be eliminated travels in a state permitting the embarkation and the disembarkation of the users until an adjustment of the operation interval of the remaining vehicles 52A~52C is completed. Further, after the adjustment of the operation interval of the remaining vehicles 52A~52C is completed, the vehicle 52D to be eliminated travels one lap of the travel path 50 in a state permitting only the disembarkation of the users, and refusing embarkation.

Figure 16:
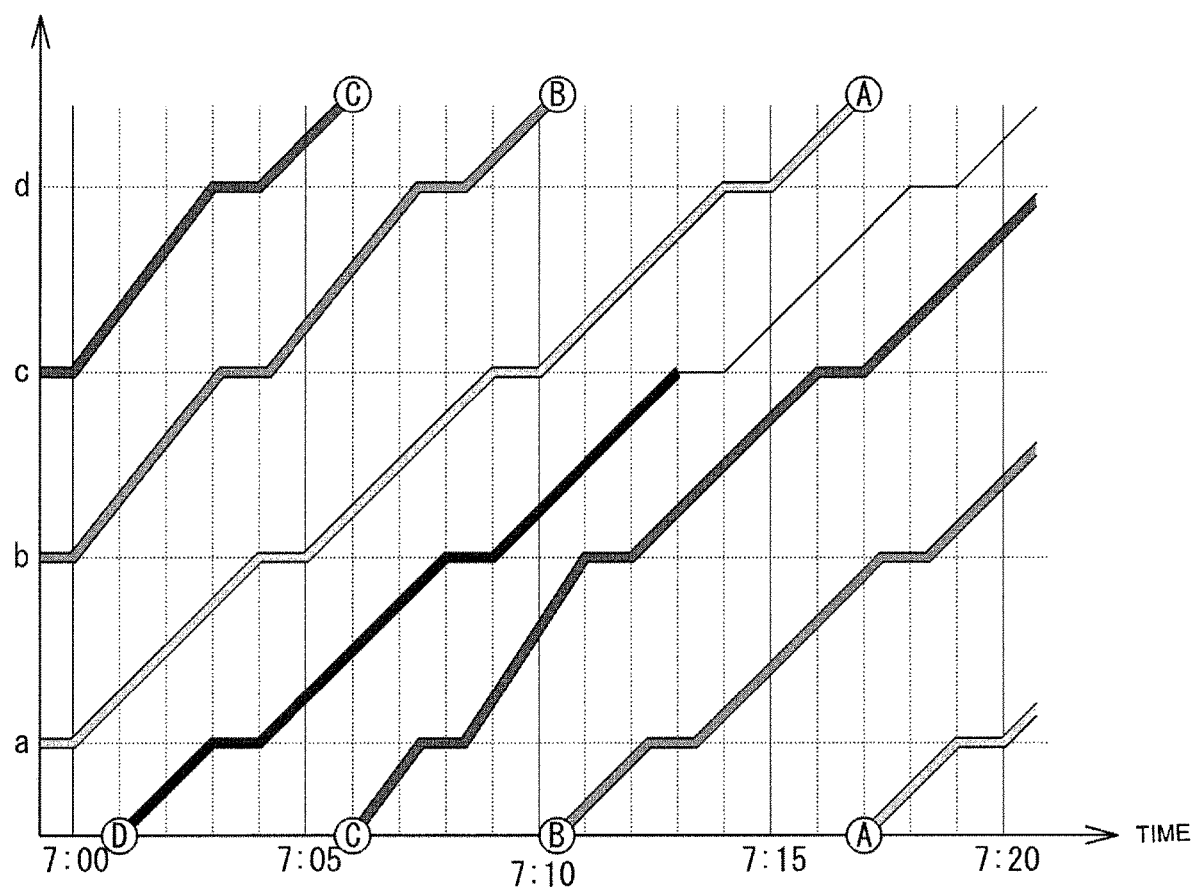
FIG. 16 is an operation timing chart of each vehicle which travels autonomously according to the travel plan of FIG. 15.

The travel plan 80 which is thus re-generated is transmitted to each of the plurality of vehicles 52A~52D. Each of the vehicles 52 travels autonomously according to the re-generated travel plan 80. FIG. 16 is a timing chart of the vehicles 52~52D which travel autonomously according to the travel plans 80 of FIG. 15. As shown in FIG. 16, when the elimination of the vehicle 52D is determined at 7:00, the velocities of the vehicles 52B and 52C are temporarily increased in order to realize the equal-interval operation of the remaining vehicles 52A~52C. With the temporary increase of the velocities, around the time of 7:12, the arrival interval of the vehicles 52A~52C at each station 54 is set to about 6.6 minutes.

On the other hand, the vehicle 52D permits both the embarkation and the disembarkation of the users until around 7:12 while the velocity is adjusted to avoid interference with the other vehicles 52A~52C. After the time of 7:12 when the vehicles 52A~52C are set in the equal-interval operation, the vehicle 52D travels one lap while permitting the disembarkation of the passengers who have already embarked, but refusing new embarkation. In the example configuration of FIG. 16, the vehicle 52D travels while refusing embarkation and permitting disembarkation of the passengers at the stations 54c, 54d, 54a, and 54b after 7:13.

In this manner, when the elimination of the vehicle 52D is determined and the velocities of the vehicles 52 other than the reference vehicle are temporarily increased in order to adjust the operation to the equal-interval operation, excessive increases in the maximum wait time TW at each station and the inter-station required time TT can be suppressed. For example, in the example configuration of FIG. 15, at any station 54 and at any timing, the maximum wait time TW can be set to 6.6 minutes or less, and the inter-station required time TT can be set to 5 minutes or less. With such a configuration, the movement time and the wait time of the users who embark the vehicle can be maintained short, and the convenience of the users can thus be maintained high.

Figure 17:
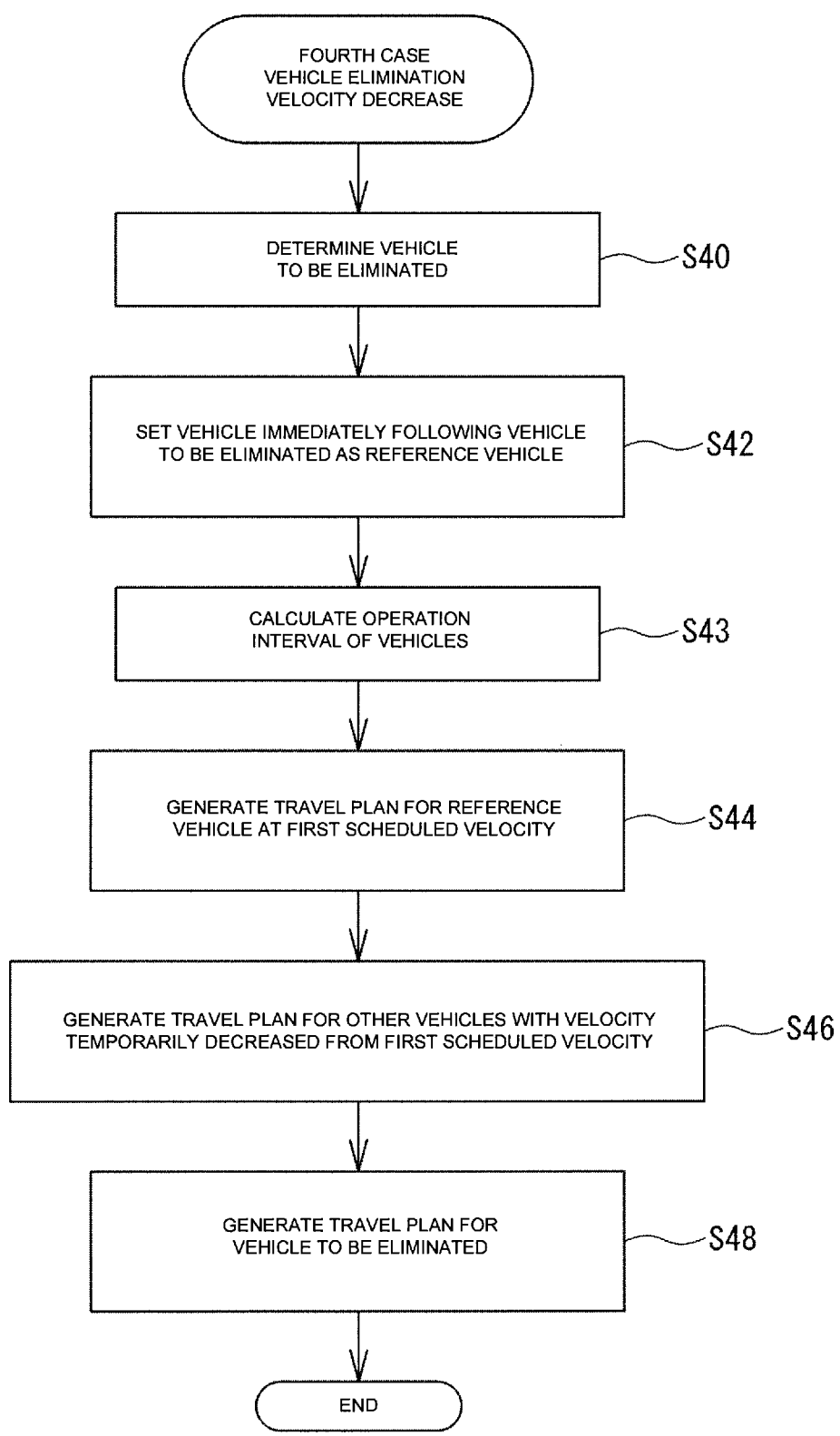
FIG. 17 is a flowchart showing a flow of generation of a travel plan in a fourth case.

Next, a fourth case will be described in which it is judged that the elimination of the vehicle 52 is necessary and the velocities of the vehicles 52 other than the reference vehicle are temporarily decreased. FIG. 17 is a flowchart showing a flow of generation of the travel plan 80 in the fourth case, and FIG. 18 is a diagram showing an example of the travel plan 80 which is generated.

When it is judged that the elimination of the vehicle 52 is necessary, the plan generator 14 determines a vehicle 52 to be eliminated (S40). Once the vehicle 52 to be eliminated is determined, the plan generator 14 sets a reference vehicle (S42). In the fourth case, unlike the third case, a vehicle 52 immediately following the vehicle to be eliminated is set as the reference vehicle. In the example configuration of FIG. 13, the vehicle 52C immediately following the vehicle 52D to be eliminated is set as the reference vehicle. Then, the plan generator 14 calculates the operation interval of the vehicles 52 (S43). In the example configuration of FIG. 13, the operation interval after the elimination of the vehicle is 20/3≈6.6 minutes.

Next, the plan generator 14 generates a travel plan 80 to cause the reference vehicle to travel at a first scheduled velocity VS1 (S44). In the example configuration of FIG. 18, the scheduled velocity VS which is set for the plurality of vehicles 52 before the elimination of the vehicle 52 is set as the first scheduled velocity VS1. Therefore, in this case, the scheduled velocity VS of the vehicle 52C which is the reference vehicle does not change before and after the elimination of the vehicle 52, and the travel plan 80 also does not change before and after the elimination of the vehicle 52D.

Next, the plan generator 14 generates a travel plan 80 for each of the vehicles 52 other than the reference vehicle and the vehicle 52 to be eliminated, in which the velocity is temporarily decreased from the first scheduled velocity VS1 so that an equal-interval operation can be achieved (S44). In the example configuration of FIG. 18, the scheduled velocities VS of the vehicles 52A and 52B other than the vehicles 52C and 52D are temporarily decreased from the first scheduled velocity VS1. For example, in the example configuration of FIG. 18, with the first scheduled velocity VS1, the inter-station required time TT is 5 minutes. On the other hand, for the vehicle 52A, immediately after the determination of the elimination of the vehicle 52D, the inter-station required time TT is temporarily extended to 8 minutes, and the scheduled velocity VS is lower than the first scheduled velocity VS1. Similarly, for the vehicle 52B, immediately after the determination of the elimination of the vehicle 52D, the inter-station required time TT is temporarily extended to 6 minutes, and the scheduled velocity VS is lower than the first scheduled velocity VS1.

Once the vehicles 52A~52C which are not eliminated and which remain operate in the equal-interval operation as a result of the velocity decrease, the plurality of vehicles 52A and 52B are caused to travel at the first scheduled velocity VS1. In the example configuration of FIG. 18, the vehicle 52A is planned to travel at the first scheduled velocity VS1 after the vehicle 52A departs from the station 54b.

Next, the plan generator 14 generates the travel plan 80 of the vehicle 52D to be eliminated (S48). Similar to the third case, for the vehicle 52 to be eliminated, a travel plan 80 is generated which prevents interference with the remaining vehicles 52A~52C. The vehicle 52D to be eliminated permits the embarkation and the disembarkation of the users until the adjustment of the operation interval of the remaining vehicles 52A~52C is completed, and travels one lap of the travel path 50 in a state permitting only the disembarkation of the users and refusing the embarkation after the adjustment is completed.

Figure 19:
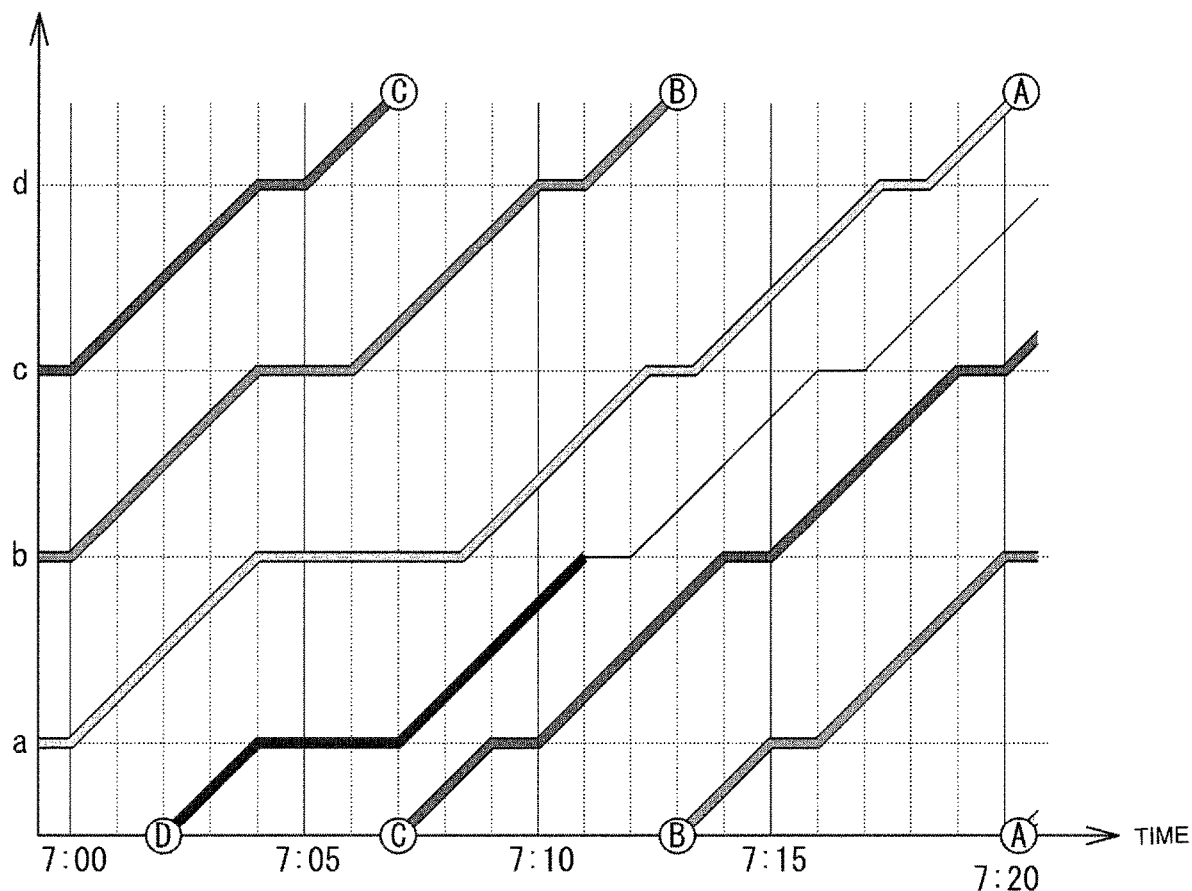
FIG. 19 is an operation timing chart of each vehicle which travels autonomously according to the travel plan of FIG. 18.

The travel plan 80 thus re-generated is transmitted to each of the plurality of vehicles 52A~52D. Each of the vehicles 52 travels autonomously according to the travel plan 80 which is re-generated. FIG. 19 is an operation timing flowchart of the vehicles 52A 52D which travel autonomously according to the travel plans 80 of FIG. 18. As shown in FIG. 19, when the elimination of the vehicle 52D is determined at 7:00, the velocities of the vehicles 52A and 52B are temporarily decreased so as to achieve the equal-interval operation by the remaining vehicles 52A~52C. With the temporary decrease of the velocity, around a time of 7:09, the arrival interval of the vehicles 52A~52C at each station 54 is set to about 6.6 minutes.

On the other hand, the vehicle 52D permits the embarkation and the disembarkation of the users until around 7:09 while the velocity is adjusted to prevent the interference with the other vehicles 52A~52C. After 7:09 at which the equal-interval operation by the vehicles 52A~52C is realized, the vehicle 52D travels one lap in a state permitting the disembarkation of the users who have already embarked, but refusing the embarkation. In the example configuration of FIG. 19, the vehicle 52D travels while permitting passengers to disembark at stations 54b, 54c, 54d, and 54a, but refusing the embarkation, after 7:10.

As is clear from the above description, in either of the third case and the fourth case, the embarkation and the disembarkation of the users are permitted for the vehicle 52D to be eliminated until the adjustment of the interval of the remaining vehicles 52A~52C is completed. With such a configuration, an excessive increase of the maximum wait time TW can be prevented. Specifically, if the embarkation onto the vehicle 52D to be eliminated is prohibited before the adjustment of the interval of the remaining vehicles 52A 52C is completed, a user who did not arrive in time for the vehicle 52A which departs from the station 54a at 7:00 must wait about 10 minutes until the next vehicle 52C arrives, which degrades the convenience for the user. On the other hand, by permitting the embarkation to the vehicle 52D to be eliminated until the adjustment of the interval of the remaining vehicles 52A~52C is completed, the maximum wait time TW of the user who did not arrive in time for the vehicle 52A which departs from the station 54a at 7:00 can be reduced to about 7 minutes. With such a configuration, the movement time and the wait time of the users who embark the vehicle can be maintained short, and the convenience for the user can be maintained high.

Next, a method of determining the position of addition of the vehicle 52 will be described. When it is judged that the addition of the vehicle 52 is necessary, the plan generator 14 determines the position of addition of a new vehicle 52 in the vehicle line based on at least one of the travel information 82 or the passenger information 84 transmitted from each vehicle 52.

For example, there may be cases in which, due to some reason, a vehicle 52 becomes unable to continue operation. The travel information 82 includes information on such possibility/impossibility of continued operation. When a vehicle becomes non-operable and unable to continue operation, the judging unit 19 determines the addition of the new vehicle 52 in place of the non-operable vehicle. In addition, the plan generator 14 determines a position between two vehicles 52 traveling immediately before and immediately after the non-operable vehicle as a position of addition of the new vehicle 52.

Figure 20:
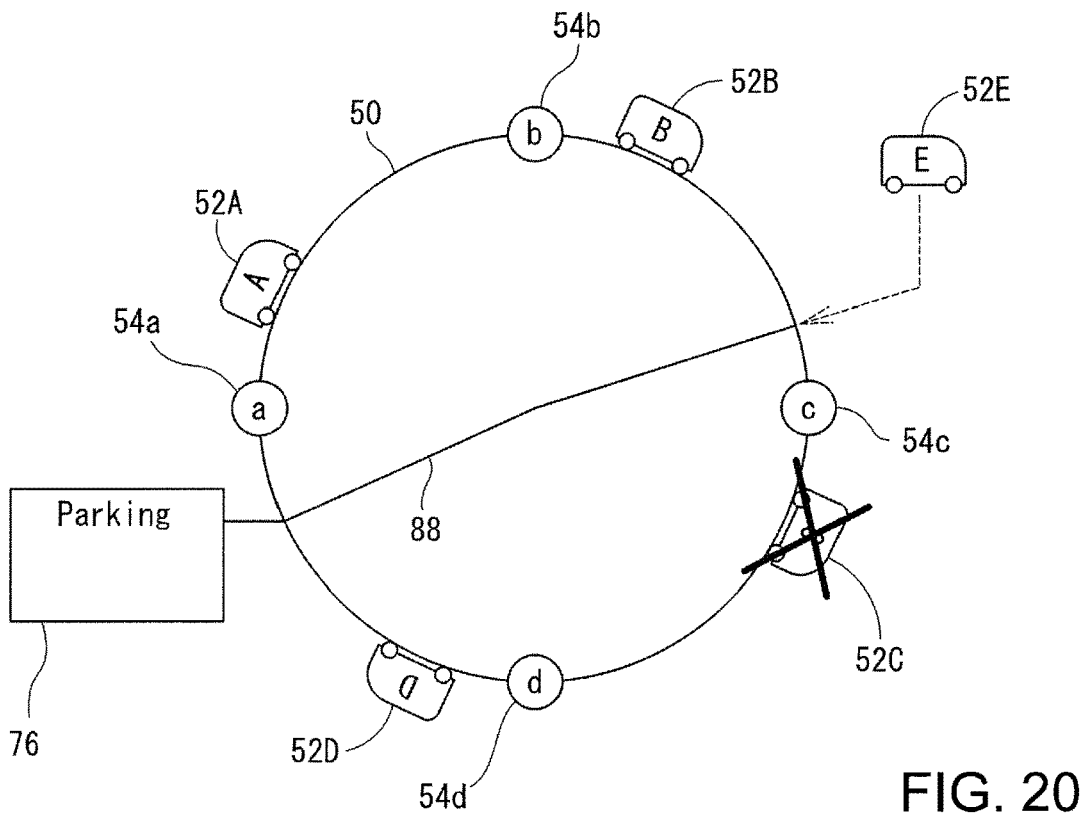
FIG. 20 is a conceptual diagram showing determination of a position of addition when a vehicle becomes non-operable and cannot continue to operate.

For example, as shown in FIG. 20, when the vehicle 52C becomes unable to continue operating, the plan generator 14 determines a position between the vehicle 52B and the vehicle 52D as a position of addition of a new vehicle 52E, for the following reason.

When the vehicle 52C becomes non-operable, obviously, the operation interval between the vehicle 52B and the vehicle 52D becomes significantly large. For example, when the new vehicle 52E is not added, a time period from a time when the vehicle 52D departs from the station 54d to a time when the vehicle 52B departs from the station 54d, that is, the maximum wait time TW, is significantly increased. As the maximum wait time TW becomes longer, the number of users who wait at the station 54d for the vehicle 52B also tends to be increased. That is, a number of users who desire to embark the vehicle 52B at the station 54d becomes large, resulting in an increase in the time required for the embarkation and the disembarkation, and consequently, a delay of the vehicle 52B. Further, when the vehicle 52C becomes non-operable, the users who embarked the vehicle 52C must be accommodated by the vehicle 52B which is a following vehicle. Because of this, the number of passengers on the vehicle 52B also tends to become larger, and there may be a possibility that, at the station 54d, not all of the desiring users can embark, and the users may overflow.

On the other hand, when the new vehicle 52E is added between the vehicle 52B and the vehicle 52D, the operation intervals of the vehicles 52 can be quickly recovered to the equal interval. As a result, the number of users who desire to embark the vehicle 52B can be reduced, and occurrence of the delay of the vehicle 52B and the overflow can be effectively suppressed.

Once the position of addition is determined, the vehicle 52E to be added may actively move to the position of addition, or may wait for the position of addition in the vehicle line to reach the wait position 76. Specifically, when it is determined that the vehicle is to be added at a position immediately before the vehicle 52B, the vehicle 52E to be added may actively move to the position immediately before the vehicle 52B via a shortcut 88 or the like. Alternatively, in another configuration, the vehicle 52E to be added may wait at the wait position 76 until the vehicle 52D passes the wait position 76, and may enter from the wait position to the travel path 50 before the vehicle 52B arrives at the wait position 76.

Alternatively, when no non-operable vehicle occurs, the position of addition of the new vehicle 52 may be determined based on the operation interval of the vehicles 52. For example, when the travel information 82 sent from the vehicle 52 includes position information of the vehicle, the plan generator 14 calculates operation intervals of the plurality of vehicles 52 based on the position information. For example, the plan generator 14 may store a time when each of the vehicles 52A-52D departs from a particular station 54, and may calculate departure intervals thereof as the operation intervals. The plan generator 14 may then determine a position immediately before a vehicle 52 having the largest operation interval with a preceding vehicle 52 as the position of addition of the new vehicle 52.

Figure 21:
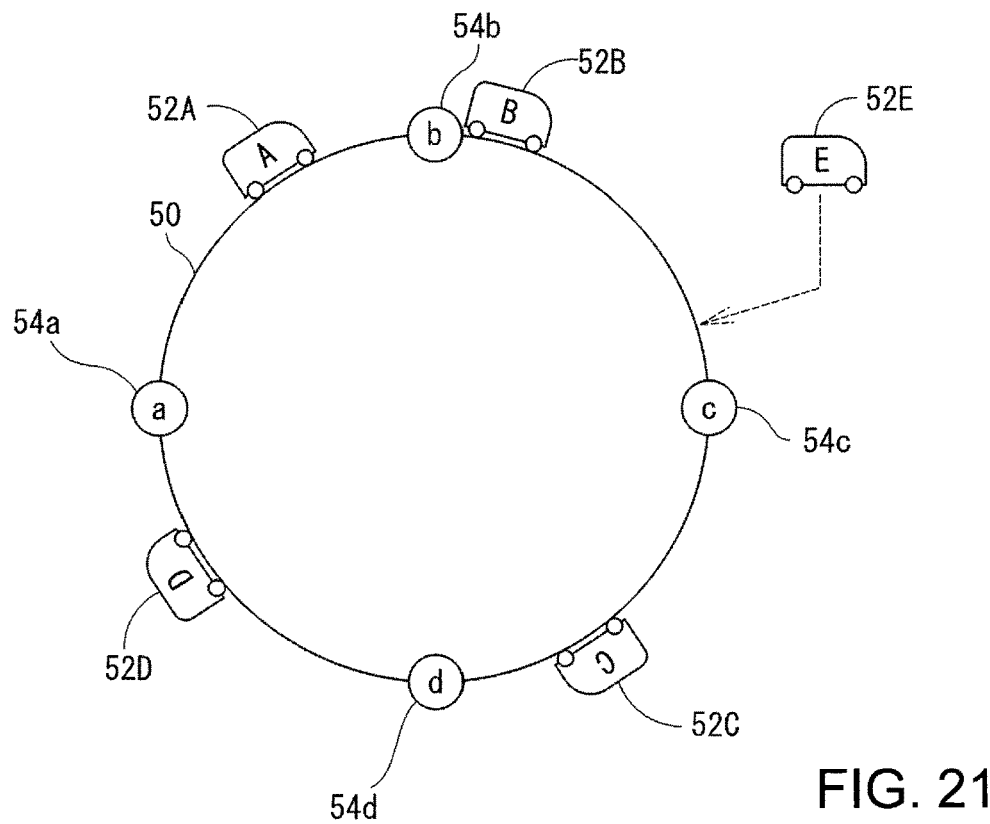
FIG. 21 is a conceptual diagram showing determination of a position of addition based on an operation interval.

For example, as shown in FIG. 21, when the operation interval between the vehicle 52B and the vehicle 52C is larger than the operation intervals between other vehicles, a position immediately before the vehicle 52B may be determined as the position of addition. With such a configuration, the operation intervals of the vehicles 52 can be quickly recovered to the equal intervals. In addition, as described above, if a state of a widened operation interval is left unattended, the maximum wait time TW of the vehicle 52B increases, resulting in an increase in the embarkation/disembarkation time and problems such as the overflow. By adding the new vehicle 52E before this vehicle 52B, a further delay and the overflow of the vehicle 52B can be effectively suppressed.

Alternatively, in another configuration, a magnitude relationship of disembarkation times of the passengers among the plurality of vehicles may be estimated, and a position between a vehicle 52 having the maximum disembarkation time and a vehicle 52 immediately before the vehicle 52 with the maximum disembarkation time may be determined as the position of addition of the new vehicle 52. In this case, the travel information 82 sent from the vehicle 52 includes at least a number of passengers of the vehicle 52. In addition, the travel information may further include an attribute of a passenger. The attribute is a property which affects the disembarkation time, and includes, for example, at least one of use/non-use of a wheelchair, use/non-use of a cane for the visually impaired, use/non-use of outfits, use/non-use of a baby carriage, or an age group. The plan generator 14 estimates an estimated disembarkation time of each passenger based on such attributes, and calculates a total value of the estimated disembarkation times of the passengers embarking one vehicle 52 as a disembarkation time indication of the vehicle 52. The plan generator 14 then determines a position immediately before a vehicle 52 having the highest disembarkation time indication among the plurality of vehicles 52 as the position of addition of the new vehicle 52.

Figure 22:
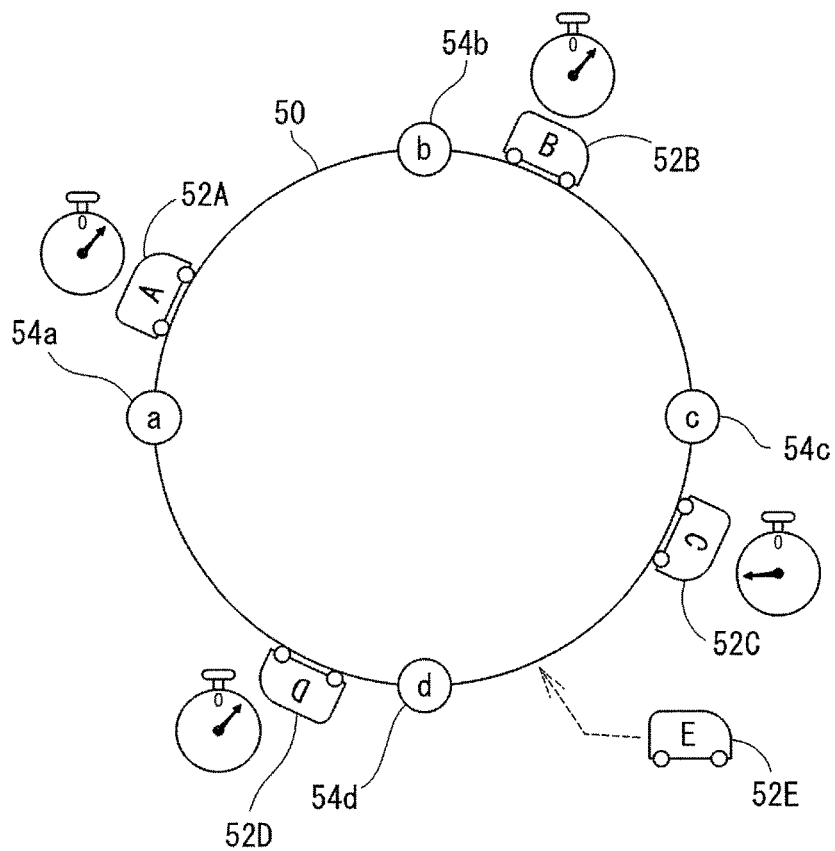
FIG. 22 is a conceptual diagram showing determination of a position of addition based on a disembarkation time.

For example, an example configuration of FIG. 22 is considered. In FIG. 22, a position of a hand of a stopwatch shown near each vehicle 52 indicates a magnitude of the disembarkation time indication of the vehicle 52. According to the example configuration of FIG. 22, the disembarkation time indication of the vehicle 52C is higher than the disembarkation time indications of the other vehicles 52A, 52B, and 52D. Thus, in this case, the plan generator 14 determines a position immediately before the vehicle 52C as the position of addition of the new vehicle 52E.

Such a configuration is employed because, for the vehicle 52C having a high disembarkation time indication, the embarkation/disembarkation time tends to become long, and a risk of occurrence of the delay is higher. By adding the new vehicle 52E immediately before the vehicle 52C which tends to be delayed, the operation interval between the vehicle 52C and the vehicle 52E immediately before the vehicle 52C can be narrowed, although the narrowing may be temporary. When the operation interval is short, the number of users desiring to embark the vehicle 52C can be reduced, and occurrence of a further delay and the overflow can thus be effectively suppressed.

Alternatively, in another configuration, a percentage of passengers in relation to the capacity of the vehicle; that is, an embarkation percentage, may be estimated for the plurality of vehicles, and a position immediately before a vehicle 52 having the highest embarkation percentage may be determined as the position of addition of the new vehicle 52. In this case, the travel information 82 sent from the vehicle 52 may include at least the number of passengers of the vehicle 52. In addition, the travel information 82 may further include an attribute of a passenger. In this case, the attribute is a property which affects an occupied area by the passenger in the vehicle, and may include, for example, at least one of use/non-use of a wheelchair, use/non-use of a baby carriage, or presence/absence of a large-size baggage. The plan generator 14 estimates the embarkation percentage based on the passenger information 84. The plan generator 14 then determines a position immediately before a vehicle having the highest embarkation percentage as the position of addition of the new vehicle 52.

Figure 23:
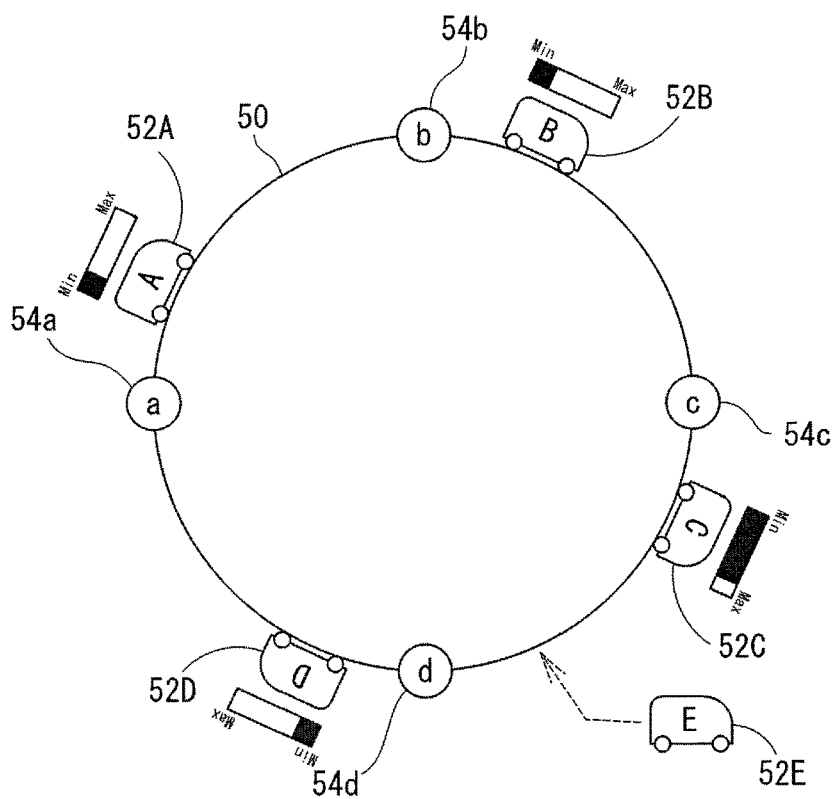
FIG. 23 is a conceptual diagram showing determination of a position of addition based on an embarkation percentage.

For example, an example configuration of FIG. 23 is considered. In FIG. 23, a meter shown near each vehicle 52 indicates the embarkation percentage of the vehicle 52, with a larger black portion indicating a higher embarkation percentage. According to the example configuration of FIG. 23, the embarkation percentage of the vehicle 52C is higher than the embarkation percentages of the other vehicles 52A, 52B, and 52D. Because of this, in this case, the plan generator 14 determines a position immediately before the vehicle 52C as the position of addition of the new vehicle 52E.

Such a configuration is employed because, in the vehicle 52C having a high embarkation percentage, a number of users who can newly embark is small, and the risk of occurrence of the overflow is high. By adding the new vehicle 52E immediately before the vehicle 52C which tends to overflow, the number of users who desire to embark the vehicle 52C can be suppressed, and the overflow of the vehicle 52C can be effectively suppressed.

Figure 24:
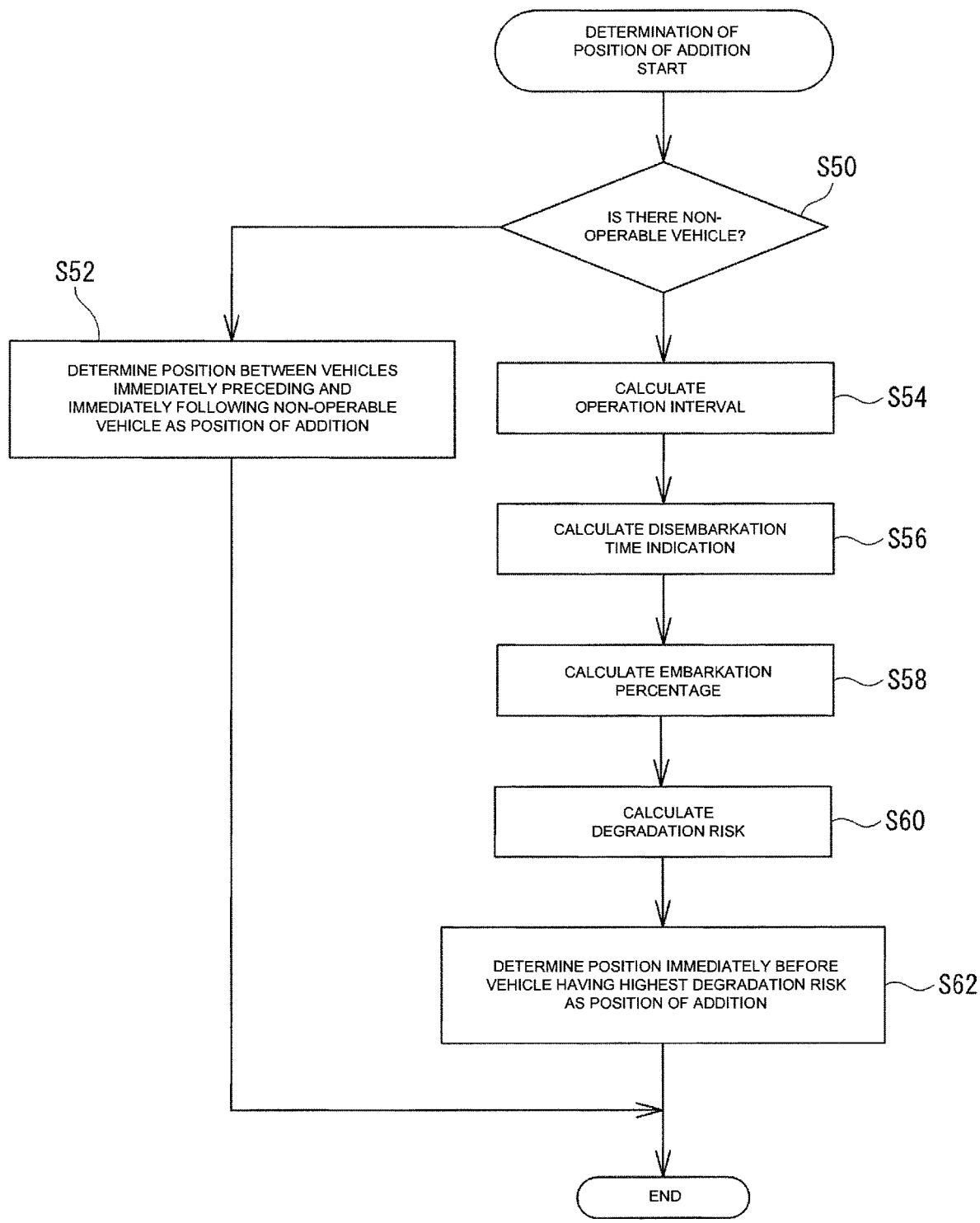
FIG. 24 is a flowchart showing an example of flow of determination of a position of addition of a new vehicle.

Alternatively, in another configuration, the position of addition of the new vehicle 52 may be determined in comprehensive consideration of at least two of the operation interval with the preceding vehicle, the disembarkation time indication, and the embarkation percentage. For example, a degradation risk, which becomes higher as the operation interval with the preceding vehicle becomes larger, as the disembarkation time indication becomes higher, and as the embarkation percentage becomes higher, is calculated for each vehicle 52, and a position immediately before a vehicle 52 having the highest degradation risk may be determined as the position of addition of the new vehicle 52. A flow in this case will be described with reference to FIG. 24. FIG. 24 is a flowchart of an example flow of determination of the position of addition of the new vehicle 52.

When the addition of the vehicle 52 is necessary, the plan generator 14 first judges whether or not there is a non-operable vehicle 52 which becomes unable to continue operating, among the plurality of vehicles 52 (S50). When there is a non-operable vehicle 52, the plan generator 14 determines a position between vehicles preceding and following the non-operable vehicle 52 as the position of addition (S52). On the other hand, when there is no non-operable vehicle 52, the plan generator 14 calculates the degradation risk of each vehicle 52 (S54~S60).

More specifically, the plan generator 14 calculates each of the operation interval with the preceding vehicle, the disembarkation time indication, and the embarkation percentage (S54~S58). Then, the plan generator 14 performs a weighted addition of the calculated operation interval, the calculated disembarkation time indication, and the calculated embarkation percentage, to calculate the degradation risk (S60). For example, when R denotes the degradation risk, P1 denotes the operation interval, P2 denotes the disembarkation time indication, P3 denotes the embarkation percentage, and K1, K2, and K3 denote coefficients of predetermined values, the degradation risk is calculated by $R=K1*P1+K2*P2+K3*P3$. Once the degradation risk is calculated, the plan generator 14 determines a position immediately before a vehicle 52 having the largest degradation risk as the position of addition of the new vehicle 52 (S62).

As is clear from the above description, according to the embodiment of the present disclosure, because the position of addition of the new vehicle 52 is determined based on at least one of the travel information 82 or the passenger information 84, the equal-interval operation can be quickly recovered, and the delay and overflow of other vehicles 52 can be effectively suppressed.

The configurations described above are merely exemplary, and the structures may be suitably changed so long as the position of addition is determined based on at least one of the travel information 82 or the passenger information 84 when it is judged that the addition of the vehicle 52 is necessary. Thus, the number of vehicles 52 forming the vehicle line, the number of stations 54, the interval at the station 54, and the like may be suitably changed. In addition, rules for correction of the travel plan 80 when the vehicle is added or eliminated are not limited to those described above, and may be suitably changed.

The invention claimed is:

1. A transportation system of a plurality of vehicles, the transportation system comprising:
   a surroundings sensor that detects a periphery of surroundings of each vehicle;
   a position sensor that detects a current position of each vehicle;
   a first memory storing a detection result of the surroundings sensor and the position sensor;
   a controller that performs control to drive a drive unit to execute autonomous travel based on a detection result of the surroundings sensor and the position sensor;
   a second memory storing executable instructions; and
   a processor programmed to execute the instructions to:
      generate a travel plan for each of the plurality of vehicles which form a vehicle line and which travel autonomously along a prescribed travel path,
      judge a transportation demand of passengers based on at least one of travel information, which is information related to a traveling state, or passenger information, which is information related to a passenger who is a user of a vehicle, transmitted from each of the plurality of vehicles;
      judge a necessity of an increase or a decrease in the number of vehicles forming the vehicle line based on the judged transportation demand of the passengers;
      when it is judged that the increase in the number of vehicles forming the vehicle line is necessary, determine a position of addition of a new vehicle in the vehicle line based on at least one of the travel information or the passenger information, transmitted from each of the plurality of vehicles, and generate the travel plan for adding the new vehicle at the position of addition; and
      transmit the travel plan to the new vehicle.

2. The transportation system according to claim 1, wherein
   the travel information includes a traveling position of the vehicle, and
   the processor is programmed to execute the instructions to calculate an operation interval of the plurality of vehicles based on the traveling position, and determine a position immediately before a vehicle having a largest operation interval with a preceding vehicle as the position of addition of the new vehicle.

3. The transportation system according to claim 1, wherein
the travel information includes an indication of at least one of a possibility or an impossibility of a continued operation of the vehicle, and
when there is a non-operable vehicle, which is unable to continue operating, in the vehicle line, the processor is programmed to execute the instructions to determine as the position of addition a position between two vehicles traveling immediately before and immediately after the non-operable vehicle.

4. The transportation system according to claim 1, wherein
the passenger information includes at least a number of passengers of the vehicle, and
the processor is programmed to:
execute the instructions to estimate a magnitude relationship of disembarkation times of the passengers among the plurality of vehicles based on the passenger information; and
determine a position immediately before a vehicle having a largest disembarkation time as the position of addition.

5. The transportation system according to claim 1, wherein
the passenger information includes at least a number of passengers of the vehicle, and
the processor is programmed to:
execute the instructions to calculate an embarkation percentage indicating a percentage of the passengers in relation to a capacity of each vehicle based on the passenger information; and
determine as the position of addition a position immediately before a vehicle having a highest embarkation percentage.

6. The transportation system according to claim 1, wherein
the travel information includes a traveling position of the vehicle,
the passenger information includes at least a number of passengers of the vehicle, and
the processor is programmed to:
execute the instructions to calculate an operation interval of the plurality of vehicles based on the traveling position, a disembarkation time of the passenger among a plurality of vehicles in front and rear based on the passenger information, and an embarkation percentage indicating a percentage of the passengers in relation to a capacity of each vehicle based on the passenger information;
calculate a degradation risk by performing a weighted addition, with a predetermined ratio, of the calculated operation interval with a preceding vehicle, the calculated disembarkation time, and the calculated embarkation percentage; and
determine a position immediately before a vehicle having a highest degradation risk as the position of addition.

7. The transportation system according to claim 1, wherein
when it is judged that the addition of the vehicle is necessary, the processor is programmed to execute the instructions to generate a travel plan in which a reference vehicle, which is one of a plurality of vehicles which form a vehicle line before the addition of the vehicle, is caused to travel at a first scheduled velocity, and generate a travel plan in which each of vehicles other than the reference vehicle is caused to travel at a scheduled velocity which is temporarily increased or temporarily decreased from the first scheduled velocity.

8. The transportation system according to claim 1, wherein
the processor is programmed to execute the instructions to judge a necessity of an increase or a decrease in the number of vehicles forming the vehicle line based on an amount of delay of the vehicle with respect to the travel plan.

9. The transportation system according to claim 1, wherein
the processor is programmed to execute the instructions to judge a necessity of an increase or a decrease in the number of vehicles forming the vehicle line based on information indicating that at least one of the vehicles forming the vehicle line becomes unable to continue operating.

10. The transportation system according to claim 1, wherein
the processor is programmed to execute the instructions to judge a necessity of an increase or a decrease in the number of vehicles forming the vehicle line based on passenger information which is information related to the passenger.

11. The transportation system according to claim 1, when it is judged that the increase in the number of vehicles forming the vehicle line is necessary, the processor is programmed to execute the instructions to determine a position of addition of a new vehicle in the vehicle line based on the passenger information.

12. A method of managing an operation, the method comprising:
generating a travel plan for each of a plurality of vehicles which form a vehicle line and which travel autonomously along a prescribed travel path, each of the plurality of vehicles comprising a respective surroundings sensor, position sensor, memory and controller;
detecting, by the surroundings sensor, a periphery of surroundings of each vehicle;
detecting, by the position sensor, a current position of each vehicle;
storing, by the memory, a detection result of the surroundings sensor and the position sensor;
performing control, by the controller, to drive a drive unit to execute autonomous travel based on the detection result of the surroundings sensor and the position sensor;
judging a transportation demand of passengers based on at least one of travel information, which is information related to a traveling state, or passenger information, which is information related to a passenger who is a user of a vehicle, transmitted from each of the plurality of vehicles;
judging a necessity of an increase or a decrease in the number of vehicles forming the vehicle line based on the judged transportation demand of the passengers;
when it is judged that the increase in the number of vehicles forming the vehicle line is necessary, determining a position of addition of a new vehicle in the vehicle line based on at least one of the travel information or the passenger information, transmitted from each of the plurality of vehicles, and generating the travel plan for adding the new vehicle at the position of addition; and transmitting the travel plan to the new vehicle.

13. A transportation system comprising:
a vehicle line comprising a plurality of vehicles which travel autonomously along a prescribed travel path, wherein each vehicle comprises:
- a surroundings sensor that detects a periphery of surroundings of each vehicle;
- a position sensor that detects a current position of each vehicle,
- a first memory storing a detection result of the surroundings sensor and the position sensor;
- a controller that performs control to drive a drive unit to execute autonomous travel based on a detection result of the surroundings sensor and the position sensor; and an operation management apparatus that manages operations of the plurality of vehicles, wherein each of the vehicles transmits, to the operation management apparatus, at least one of travel information which is information related to a traveling state of the vehicle or passenger information which is information related to a passenger, the operation management apparatus comprises:
- a second memory storing executable instructions; and
- a processor programmed to execute the instructions to:
  - generate a travel plan for each of the plurality of vehicles;
  - judge a transportation demand of passengers based on at least one of travel information, which is information related to a traveling state, or passenger information, which is information related to the passenger who is a user of a vehicle, transmitted from each of the plurality of vehicles;
  - judge a necessity of an increase or a decrease in the number of vehicles forming the vehicle line based on the judged transportation demand of the passengers;
  - when it is judged that the increase in the number of vehicles forming the vehicle line is necessary, determine a position of addition of a new vehicle in the vehicle line based on at least one of the travel information or the passenger information transmitted from each of the plurality of vehicles, and generate the travel plan for adding the new vehicle at the position of addition; and
  - transmit the travel plan to the new vehicle.

* * * * *